US010350576B2

(12) United States Patent
Gong et al.

(10) Patent No.: US 10,350,576 B2
(45) Date of Patent: *Jul. 16, 2019

(54) SUSTAINABLE AEROGELS AND USES THEREOF

(71) Applicants: Wisconsin Alumni Research Foundation, Madison, WI (US); The United States of America as Represented by the Secretary of Agriculture, Washington, DC (US)

(72) Inventors: Shaoqin Gong, Madison, WI (US); Zhiyong Cai, Madison, WI (US); Qifeng Zheng, Madison, WI (US)

(73) Assignees: WISCONSIN ALUMNI RESEARCH FOUNDATION, Madison, WI (US); THE UNITED STATES OF AMEREICA AS REPRESENTD BY THE SECRETARY OF AGRICULTURE, Washington, DC (US)

(*) Notice: Subject to any disclaimer, the term of this patent is extended or adjusted under 35 U.S.C. 154(b) by 732 days.

This patent is subject to a terminal disclaimer.

(21) Appl. No.: 14/522,866

(22) Filed: Oct. 24, 2014

(65) Prior Publication Data

US 2015/0114907 A1 Apr. 30, 2015

Related U.S. Application Data

(60) Provisional application No. 61/897,084, filed on Oct. 29, 2013.

(51) Int. Cl.
*B01J 20/32* (2006.01)
*B01J 20/28* (2006.01)
(Continued)

(52) U.S. Cl.
CPC .......... *B01J 20/3285* (2013.01); *B01J 20/24* (2013.01); *B01J 20/267* (2013.01);
(Continued)

(58) Field of Classification Search
None
See application file for complete search history.

(56) References Cited

U.S. PATENT DOCUMENTS

2004/0173536 A1* 9/2004 Coronado .............. B01D 15/00
210/693
2005/0211624 A1* 9/2005 Vane .................... B01D 61/362
210/500.37

(Continued)

OTHER PUBLICATIONS

Aulin et al. ("Aerogels from nanofibrillated cellulose with tunable oleophilicity", Soft Matter, 2010, 6, 3298-3305).*

(Continued)

*Primary Examiner* — Clare M Perrin
(74) *Attorney, Agent, or Firm* — Foley & Lardner LLP; Joseph P. Meara; Melissa El Menaouar

(57) ABSTRACT

Highly porous, lightweight, and sustainable organosilane-coated organic aerogels with ultra-low densities and excellent material properties and methods for preparing them are provided. The aerogels are modified to have a superhydrophobic and superoleophilic surface, thus leading to an extremely high affinity for oils and/or organic solvents.

25 Claims, 19 Drawing Sheets

(51) Int. Cl.
*C08B 15/02* (2006.01)
*C02F 1/28* (2006.01)
*B01J 20/26* (2006.01)
*B01J 20/24* (2006.01)
*B01J 20/30* (2006.01)
*C02F 101/32* (2006.01)
*C02F 101/20* (2006.01)

(52) U.S. Cl.
CPC ... *B01J 20/28007* (2013.01); *B01J 20/28011* (2013.01); *B01J 20/28023* (2013.01); *B01J 20/28047* (2013.01); *B01J 20/3078* (2013.01); *B01J 20/3085* (2013.01); *C02F 1/286* (2013.01); *C02F 1/288* (2013.01); *C08B 15/02* (2013.01); *C02F 1/285* (2013.01); *C02F 2101/20* (2013.01); *C02F 2101/32* (2013.01); *C02F 2305/08* (2013.01); *Y10T 428/2982* (2015.01)

(56) References Cited

U.S. PATENT DOCUMENTS

| | | | | |
|---|---|---|---|---|
| 2007/0255042 | A1* | 11/2007 | Valluzzi | B01D 15/3833 530/353 |
| 2010/0137513 | A1* | 6/2010 | Han | C08J 3/28 525/54.21 |
| 2012/0088857 | A1* | 4/2012 | Gawryla | B01J 13/0091 521/141 |
| 2014/0130710 | A1* | 5/2014 | Laukkanen | D21H 19/34 106/203.3 |
| 2014/0134088 | A1* | 5/2014 | Gebald | B01J 20/3219 423/228 |
| 2014/0154756 | A1* | 6/2014 | Nelson | C08B 15/08 435/135 |

OTHER PUBLICATIONS

SDS for 1,2,3,4-butanetetracarboxylic acid, accessed Aug. 1, 2017, p. 1.*
Cervin et al. (Cellulose, 2012, 19, 401-410).*
Gao, Kezheng et al., "Cellulose nanofiber-graphene all solid-state flexible supercapacitorst", J. Mater. Chem. A, (2013), 1, pp. 63-67.
Fadeev, A., et al., "Self-Assembly is not the Only Reaction Possible between Alkyltrichlorosilanes and Surfaces:009 Monomolecular and Oligomeric Covalently Attached Layers of Dichloro- and Trichloroalkylsilanes on Silicon," Langmuir, 2000, 16 (18), pp. 7268-7274.
Haraguchi, K., et al., "Spontaneous Formation of Characteristic Layered Morphologies in Porous Nanocomposites Prepared from Nanocomposite Hydrogels," Chem. Mater., 2005, 17 (5), pp. 931-934.
Henriksson, M., et al., "An environmentally friendly method for enzyme-assisted preparation of microfibrillated cellulose (MFC) nanofibers," European Polymer Journal 43, 2007, pp. 34340133441.
Paakko, M., et al., "Enzymatic Hydrolysis Combined with Mechanical Shearing and High-Pressure Homogenization for Nanoscale Cellulose Fibrils and Strong Gels," Biomacromolecules 2007, vol. 8, pp. 1934-1941.
Paakko, M., et al., "Long and entangled native cellulose I nanofibers allow flexible aerogels and hierarchically porous templates for functionalities," Soft Matter, 2008, 4, pp. 2492-2499.
Saito, T., "Homogeneous Suspensions of Individualized Microfibrils from TEMPO-Catalyzed Oxidation of Native Cellulose," Biomacromolecules, 2006, 7(6), pp. 1687-1691.
Saito, T., et al., "Individualization of Nano-Sized Plant Cellulose Fibrils by Direct Surface Carboxylation Using TEMPO Catalyst under Neutral Conditions" Biomacromolecules 2009, vol. 10, pp. 1992-1996.
Sehaqui, H., et al., "Mechanical performance tailoring of tough ultra-high porosity foams prepared from cellulose I nanofiber suspensions," Soft Matter, 2010, vol. 6, pp. 1824-1832.
Zhu, J., et al., "Integrated production of nano-fibrillated cellulose and cellulosic biofuel (ethanol) by enzymatic fractionation of wood fibers," Green Chem., 2011, 13, pp. 1339-1344.
Zimmerman, T., et al., "Properties of nanofibrillated cellulose from different raw materials and its reinforcement potential," Carbohydrate Polymers 79, 2010, pp. 1086-1093.

* cited by examiner

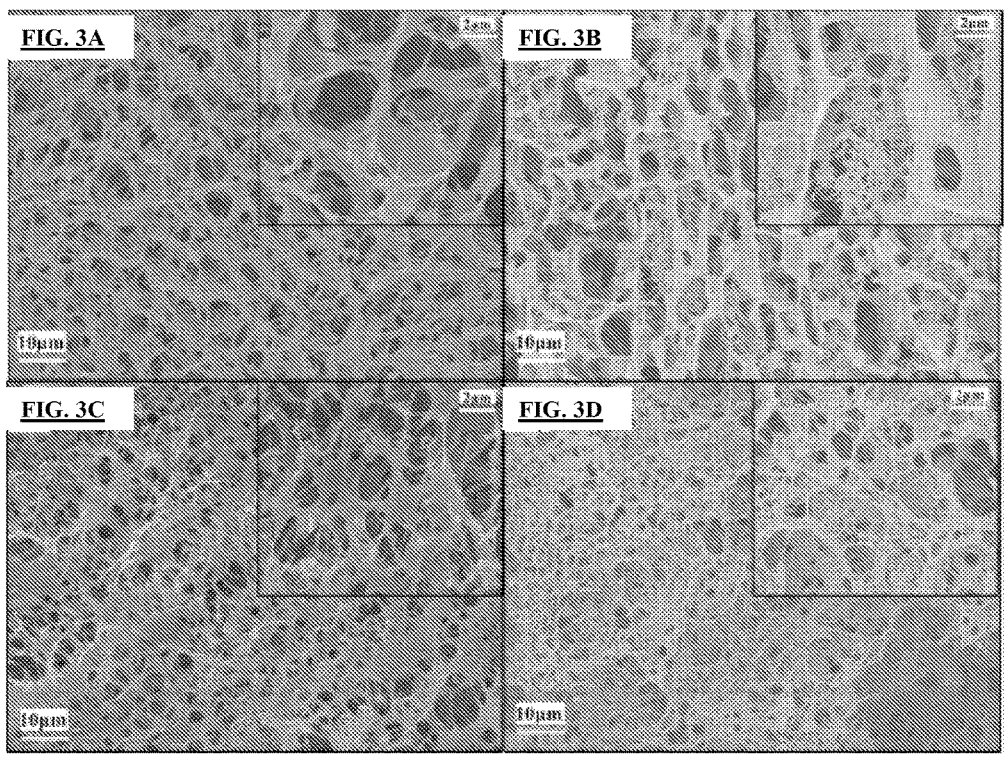

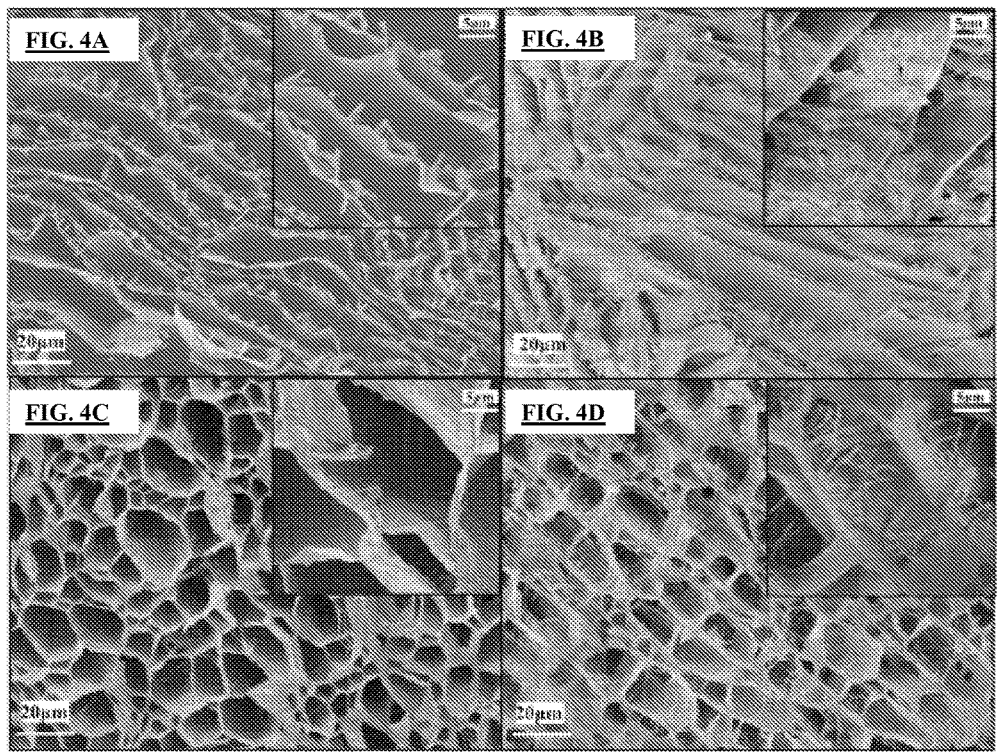

t: 0s   t: 1.0s t: 10s   t: 120s

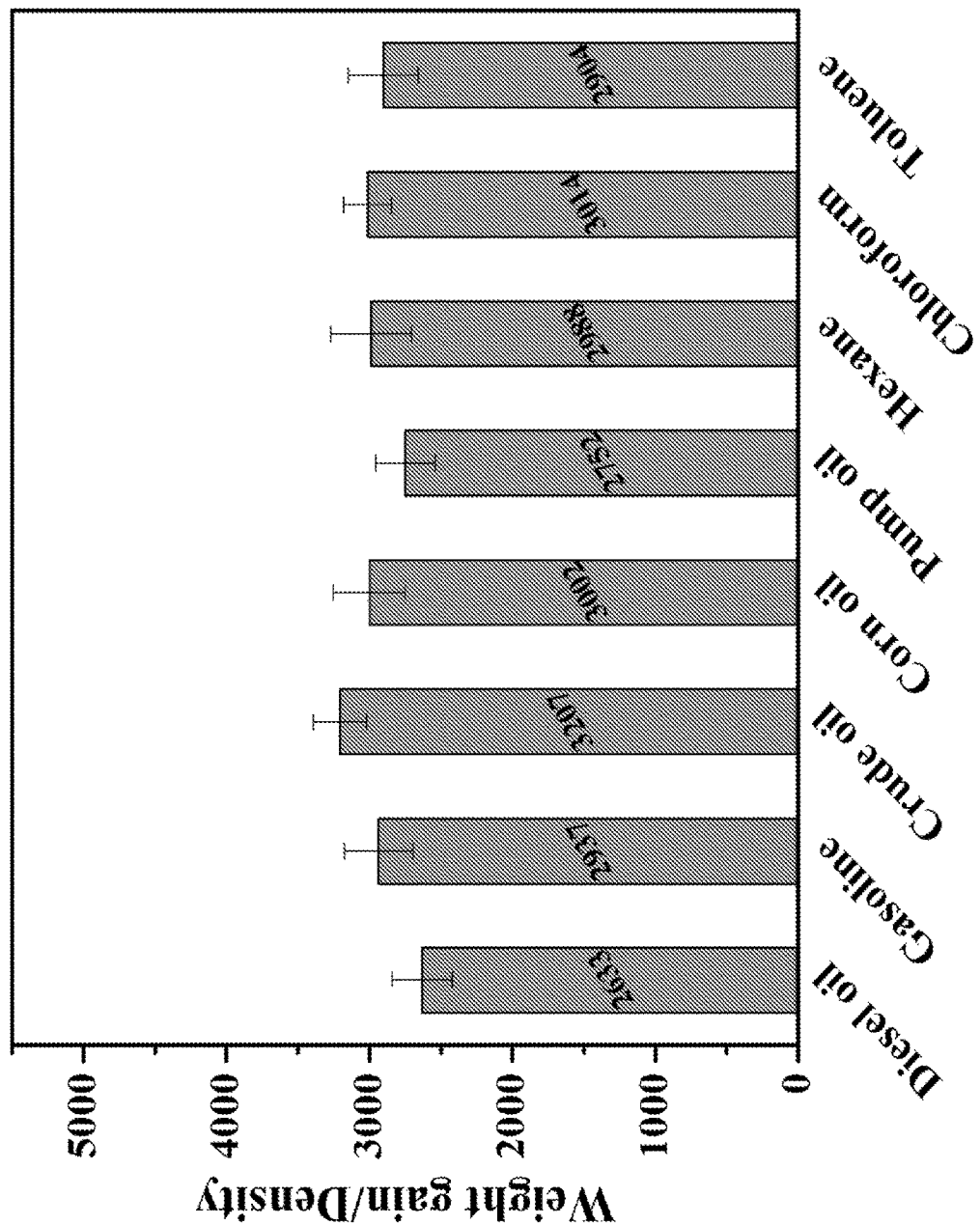

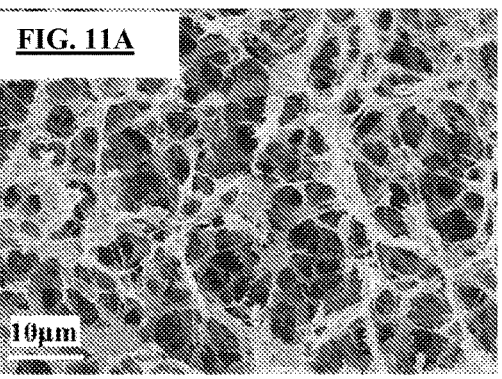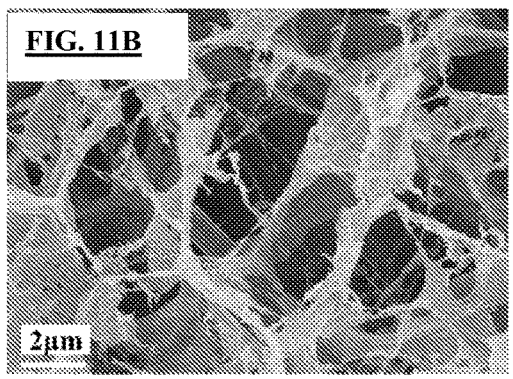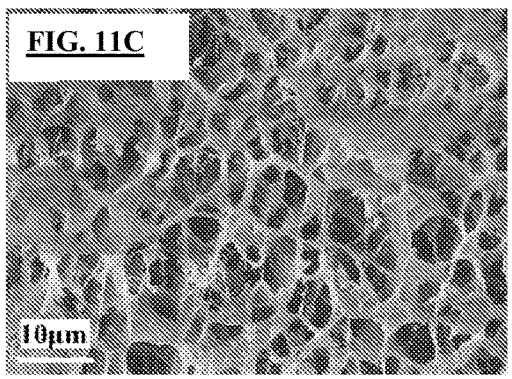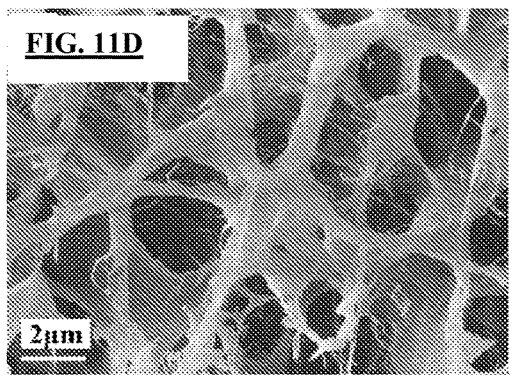

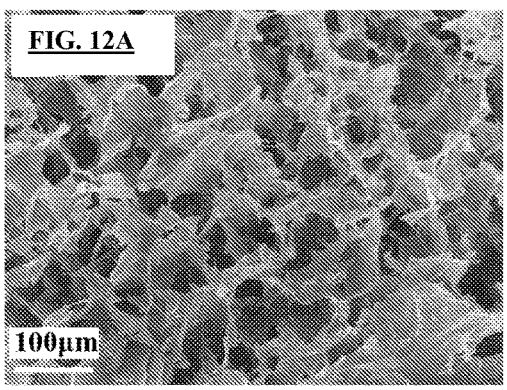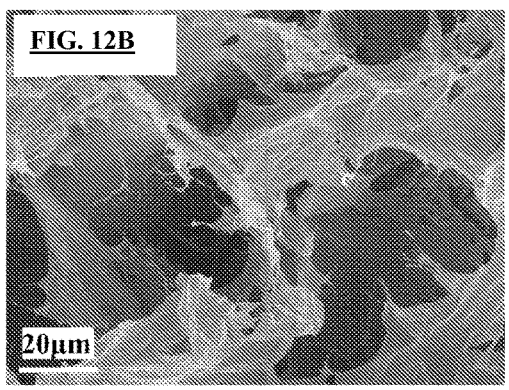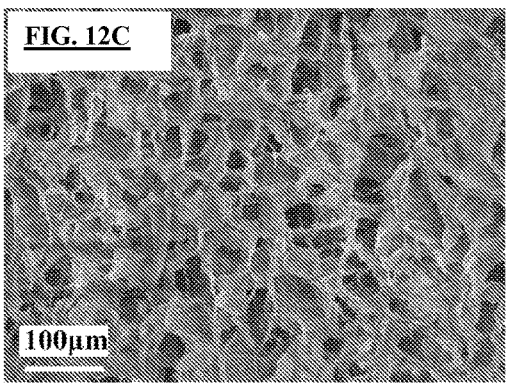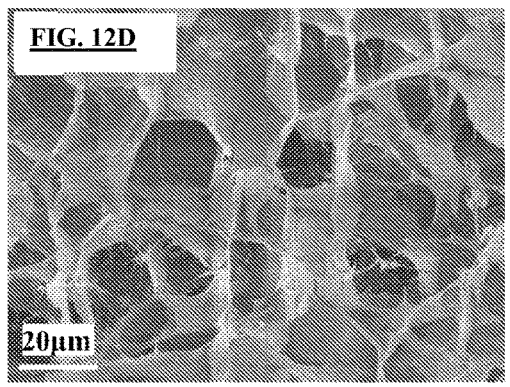

SUSTAINABLE AEROGELS AND USES THEREOF

CROSS-REFERENCE TO RELATED APPLICATIONS

This application claims priority to U.S. Provisional Patent Application No. 61/897,084, filed on Oct. 29, 2013, the entire contents of which are incorporated herein by reference.

STATEMENT OF GOVERNMENT SUPPORT

This invention was made with government support under 11-JV-11111127-098 awarded by the USDA/FS. The government has certain rights in the invention.

TECHNICAL FIELD

The present technology relates generally to the field of aerogels and to various methods for producing sustainable aerogels. In addition, the present technology pertains to applications of the sustainable aerogels, particularly superabsorbent aerogels.

SUMMARY

The present technology provides sustainable aerogels that incorporate renewable materials. Thus, the present aerogels include at least cellulose fibrils and/or crystals (e.g., nanofibrils and/or crystals, and/or microfibrils and/or crystals), optionally cross-linked, and organosilyl groups covalently attached to one or more surfaces of the aerogel. In another embodiment, the aerogels include a water-soluble organic polymer, cellulose fibrils and/or crystals, and organosilyl groups covalently attached to one or more surfaces of the aerogel. The water-soluble polymer may be cross-linked to itself and/or to the cellulose fibrils and/or crystals. In some embodiments, the cellulose fibrils and/or nanocrystals are cellulose nanofibrils and/or nanocrystals or microfibrils and/or microcrystals. The aerogels exhibit a contact angle of at least about 110°, or even at least about 120°. The organosilane surface modifier may selected to render the aerogels superhydrophobic and superoleophilic. These aerogels are highly porous with large surface to volume ratios, have great specific compressive strength compared to other types of polymer-based aerogels with similar densities, possess excellent elasticity and mechanical durability, and have great affinity for oils, organic solvents and/or metals, especially heavy metals.

The present technology further provides methods of making the organosilane-coated aerogels and articles incorporating such aerogels in various types of absorbents. In some embodiments the aerogels are superabsorbents for substituted and unsubstituted hydrocarbons, such as, e.g., halogenated hydrocarbons.

The foregoing summary is illustrative only and is not intended to be in any way limiting. In addition to the illustrative aspects, embodiments and features described above, further aspects, embodiments and features will become apparent by reference to the following drawings and the detailed description.

BRIEF DESCRIPTION OF THE DRAWINGS

FIGS. 3A-3D show SEM images of the bottom surface of PVA and PVA/CNF aerogels crosslinked with glutaraldehyde. FIG. 3A shows the surface of uncoated PVA aerogel, FIG. 3B shows the surface of silane-coated PVA aerogel, FIG. 3C shows the surface of uncoated PVA/CNF aerogel, and FIG. 3D shows the surface of silane-coated PVA/CNF aerogel.

FIGS. 4A-4D show SEM images of cryofractured surfaces of the PVA and PVA/CNF aerogels crosslinked with glutaraldehyde. FIG. 4A shows uncoated PVA aerogel, FIG. 4B shows silane-coated PVA aerogel, FIG. 4C shows uncoated PVA/CNF aerogel, and FIG. 4D shows silane-coated PVA/CNF aerogel.

FIG. 7B is a graph showing the absorption capacities of the same PVA aerogels crosslinked with glutaraldehyde normalized by the density of the respective oil or organic solvent.

FIG. 10A shows the compressive stress-strain curves of the organosilane-coated PVA/CNF aerogels crosslinked with glutaraldehyde subjected to different compressive strains, i.e., 40%, 60%, and 80%. FIGS. 10B, 10C, and 10D show the cyclic stress-strain curves of illustrative embodiments of organosilane-coated PVA/CNF aerogels crosslinked with glutaraldehyde subjected to a compressive strain of 40%, 60%, and 80% during 100 compression cycles, respectively.

FIGS. 11A-11D show SEM images of cryofractured surfaces of the small-scale PVA/CNF aerogel crosslinked with 1,2,3,4-butanetetracarboxylic acid (BTCA). FIGS. 11A and 11B show the SEM image of uncoated PVA/CNF aerogel. FIGS. 11C and 11D show the SEM image of silane-coated PVA/CNF aerogel.

FIGS. 12A-12D show SEM images of cryofractured surfaces of the large-scale PVA/CNF aerogel crosslinked with BTCA. FIGS. 12A and 12B show the SEM image of uncoated PVA/CNF aerogel. FIGS. 12C and 12D show the SEM image of silane-coated PVA/CNF aerogel.

DETAILED DESCRIPTION

Figure 1A:
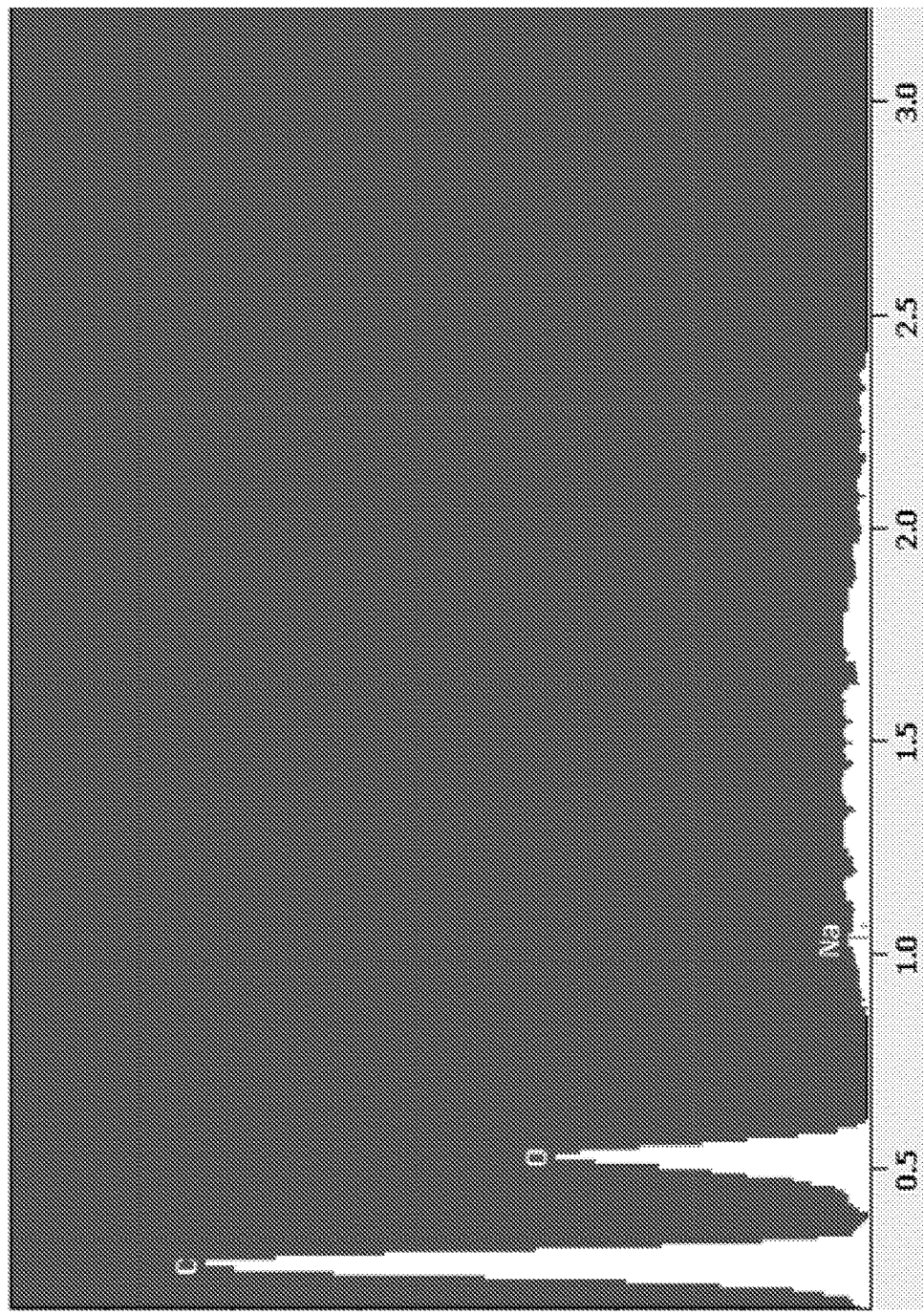
FIG. 1A shows the EDX spectrum of a non-silylated glutaraldehyde-crosslinked polyvinyl alcohol/cellulose nanofibril (PVA/CNF) aerogel.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The technology is described herein using several definitions, as set forth throughout the specification.

For the purposes of this disclosure and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The embodiments, illustratively described herein, may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described, or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specifically specified.

As used herein, the term "and/or" shall also be interpreted to be inclusive in that the term shall mean both "and" and "or." In situations where "and/or" or "or" are used as a conjunction for a group of three or more items, the group should be interpreted to include one item alone, all of the items together, or any combination or number of the items.

In general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group is substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Substituted ring groups such as substituted cycloalkyl, aryl, heterocyclyl and heteroaryl groups also include rings and ring systems in which a bond to a hydrogen atom is replaced with a bond to a carbon atom. Therefore, substituted cycloalkyl, aryl, heterocyclyl and heteroaryl groups may also be substituted with substituted or unsubstituted alkyl, alkenyl, and alkynyl groups as defined below.

Alkyl groups include straight chain and branched chain alkyl groups having from 1 to 12 carbon atoms, and typically from 1 to 10 carbons or, in some embodiments, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above, and include without limitation haloalkyl (e.g., trifluoromethyl), hydroxyalkyl, thioalkyl, aminoalkyl, alkylaminoalkyl, dialkylaminoalkyl, alkoxyalkyl, carboxyalkyl, and the like.

Alkoxy groups are hydroxyl groups (—OH) in which the hydrogen has been replaced by an alkyl group as defined herein. Representative alkoxy groups include but are not limited to methoxy, ethoxy, propoxy, isopropoxy, n-butoxy, isobutoxy, and so forth.

Cycloalkyl groups include mono-, bi- or tricyclic alkyl groups having from 3 to 12 carbon atoms in the ring(s), or, in some embodiments, 3 to 10, 3 to 8, or 3 to 4, 5, or 6 carbon atoms. Exemplary monocyclic cycloalkyl groups include, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Bi- and tricyclic ring systems include both bridged cycloalkyl groups and fused rings, such as, but not limited to, bicyclo[2.1.1]hexane, adamantyl, decalinyl, and the like. Substituted cycloalkyl groups may be substituted one or more times with, non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4- 2,5- or 2,6-disubstituted cyclohexyl groups, which may be substituted with substituents such as those listed above.

Cycloalkylalkyl groups are alkyl groups as defined above in which a hydrogen or carbon bond of an alkyl group is replaced with a bond to a cycloalkyl group as defined above. In some embodiments, cycloalkylalkyl groups have from 4 to 16 carbon atoms, 4 to 12 carbon atoms, and typically 4 to 10 carbon atoms. Substituted cycloalkylalkyl groups may be substituted at the alkyl, the cycloalkyl or both the alkyl and cycloalkyl portions of the group. Representative substituted cycloalkylalkyl groups may be mono-substituted or substituted more than once, such as, but not limited to, mono-, di- or tri-substituted with substituents such as those listed above.

Alkenyl groups include straight and branched chain alkyl groups as defined above, except that at least one double bond exists between two carbon atoms. Alkenyl groups have from 2 to 12 carbon atoms, and typically from 2 to 10 carbons or, in some embodiments, from 2 to 8, 2 to 6, or 2 to 4 carbon atoms. In some embodiments, the alkenyl group has one, two, or three carbon-carbon double bonds. Examples include, but are not limited to vinyl, allyl, —CH=CH($CH_3$), —CH=C($CH_3$)$_2$, —C($CH_3$)=$CH_2$, —C($CH_3$)=CH($CH_3$), —C($CH_2CH_3$)=$CH_2$, among others. Representative substituted alkenyl groups may be mono-substituted or substituted more than once, such as, but not limited to, mono-, di- or tri-substituted with substituents such as those listed above.

Aryl groups are cyclic aromatic hydrocarbons that do not contain heteroatoms. Aryl groups herein include monocyclic, bicyclic and tricyclic ring systems. Thus, aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups are phenyl or naphthyl. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

Aralkyl groups are alkyl groups as defined above in which a hydrogen or carbon bond of an alkyl group is replaced with a bond to an aryl group as defined above. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanylethyl. Representative substituted aralkyl groups may be substituted one or more times with substituents such as those listed above.

One aspect of the present technology provides aerogels which include a water-soluble organic polymer, cellulose fibrils and/or crystals, and organosilyl groups covalently attached to one or more surfaces of the aerogels. The resulting hybrid aerogels show drastically increased hydrophobicity compared to the unmodified polyvinyl alcohol/ cellulose nanofibril (PVA/CNF) aerogels and exhibit a contact angle of at least about 110°. In some embodiments, the water-soluble polymer is cross-linked to itself and/or to the cellulose fibrils and/or crystals.

Any suitable water-soluble organic polymer which possesses desirable properties such as water solubility, biocompatibility, and biodegradability may be used in the present aerogels. As used herein, the term "water-soluble organic polymer" means an organic polymer, having a solubility of at least 1 mg/ml in water at 25° C. In some embodiments the water-soluble organic polymer has a solubility of at least 5 mg/ml, at least 10 mg/ml, at least 25 mg/ml, at least 50 mg/ml, at least 75 mg/ml, at least 100 mg/ml or at least 150 mg/ml in water at 25° C. In some embodiments, the water-soluble organic polymer has a solubility greater than or equal to 100 mg/ml.

In some embodiments, the water-soluble organic polymer is a thermoplastic polymer. Suitable water-soluble polymers include, for example, polyvinyl alcohol, polyethylene glycol, polyacrylamide, polyacrylic acid, polymethacrylic acid, cellulose, hydroxypropylmethyl cellulose, hydroxypropyl cellulose, dextran, and dextran sulfate, or a combination of any two or more thereof. In some embodiments, the water-soluble organic polymer is polyvinyl alcohol, polyethylene glycol, polyacrylamide, polyacrylic acid, polymethacrylic acid, or a combination of any two or more thereof. In some embodiments, the water-soluble polymer is polyvinyl alcohol (PVA).

In some embodiments, the water-soluble organic polymer is a thermoset polymer. A thermoset organic polymer is an organic polymer cross-linked at least to the extent that it cannot be significantly softened or remelted by heat. Suitable thermoset polymers include, for example, polymerized resorcinol-formaldehyde, phenol-formaldehyde, urea-formaldehyde, polyamic acid salt or a combination of any two or more thereof. In some embodiments, the water-soluble polymer is polymerized resorcinol-formaldehyde. In some embodiments, the water-soluble organic polymer is cross-linked with sodium borate, boric acid, organic dialdehyde, or a combination of any two or more thereof. As used herein, "organic dialdehyde" refers to compounds that include two or more aldehyde groups (—CHO) and may include additional carbon atoms. For example, the water-soluble organic polymer may be cross-linked with one or more of 1,2,3,4-butanetetracarboxylic acid, glyoxal, glutaraldehyde, malondialdehyde, succinaldehyde and phthalaldehyde. In some embodiments, the water-soluble organic polymer is cross-linked with 1,2,3,4-butanetetracarboxylic acid. In other embodiments, the water-soluble organic polymer is cross-linked with glutaraldehyde.

The water-soluble organic polymers of the present technology may have a molecular weight from about 500 to about 200,000 Daltons (Da). In some embodiments, the water-soluble organic polymer has a molecular weight of greater than 10,000 Da. In another embodiment, the water-soluble organic polymer has a molecular weight of about 10,000 Da to about 150,000 Da, about 15,000 Da to 100,000 Da, about 20,000 Da to about 50,000 Da, or about 25,000 Da to about 35,000 Da. In some embodiments the water-soluble organic polymer has a molecular weight of about 10,000 Da, about 12,500 Da, about 25,000 Da, about 50,000 Da, about 100,000 Da, about 125,000 Da, about 150,000 Da, about 200,000 Da, or a range between and including any two of these values.

A wide variety of cellulose fibrils and/or crystals may be used in the present technology, including cellulose nanofibrils and nanocrystals (CNFs) or cellulose microfibrils and microcrystals (CMFs), such as those prepared and/or characterized in Saito et al. (*Biomacromolecules,* 2006, 7, 1687-1691); Pääkkö et al. (*Biomacromolecules,* 2007, 1934-1941); Zimmermann et al. (*Carbohydrate Polymers,* 2010, 79, 1086-1093); Postek et al. (*Measurement Science and Technology,* 2011, 024005); Zhu et al. (*Green Chemistry,* 2011, 13, 1339-1344); Pääkkö et al. (*Soft Matter,* 2008, 4, 2492-2499); Henriksson et el. (*European Polymer Journal,* 2007, 43, 3434-3441), the disclosures of which are hereby incorporated by reference in their entireties and for all purposes. The cellulose nanofibrils or nanocrystals may have a suitable average diameter in the range of about 1 to about 100 nanometers (nm). In some embodiments, the cellulose nanofibrils or nanocrystals are characterized as having average diameters in the range of about 2 nm to about 100 nm. In various embodiments, cellulose nanofibrils or nanocrystals may have average diameters in the range of about 0.01 nm to about 100 nm, about 1 nm to about 90 nm, about 2 nm to about 50 nm, about 5 nm to about 45 nm, about 10 nm to about 40 nm, or about 20 nm to about 30 nm. Examples of average diameters of cellulose nanofibrils and nanocrystals include about 1 nm, about 5 nm, about 10 nm, about 20 nm, about 30 nm, about 40 nm, about 50 nm, about 60 nm, about 70 nm, about 80 nm, about 90 nm, about 100 nm, and ranges between and including any two of these values. In some embodiments, the cellulose nanofibrils or nanocrystals is/has a diameter of 5 to 30 nm.

The cellulose microfibrils or microcrystals may have diameter in the range of about 100 to about 500 nanometers (nm). In some embodiments, the cellulose microfibrils or microcrystals are characterized as having average diameters in the range of about 100 nm to about 300 nm. In various embodiments, cellulose microfibrils or microcrystals may have average diameters in the range of about 100 nm to about 1000 nm, about 110 nm to about 500 nm, about 125 nm to about 400 nm, about 150 nm to about 350 nm, about 175 nm to about 300 nm, or about 200 nm to about 250 nm. Examples of average diameters of cellulose microfibrils and microcrystals include about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 800 nm, about 900 nm, about 1000 nm, and ranges between and including any two of these values. In some embodiments, the cellulose microfibrils and/or microcrystals have a diameter of 100 nm to 250 nm.

The length of the cellulose nanofibrils or nanocrystals and/or microfibrils or microcrystals can be optimized depending on the desired characteristics of the aerogel. In some embodiments, the cellulose nanofibrils or nanocrystals and/or microfibrils or microcrystals have a length from about 10 nm to several micrometers (μm), e.g., about 3 μm. In some embodiments, the cellulose nanofibrils or nanocrystals have a length of about 10 nm to less than 1000 nm. In some embodiments, the cellulose microfibrils or microcrystals have a length of about 1000 nm to about 3000 nm. In some embodiments, a mixture of microfibrils and/or microcrystals with nanofibrils and/or crystals may be used. In some embodiments, the cellulose nanofibrils or nanocrystals have average lengths of about 10 nm, about 20 nm, about 30 nm, about 40 nm, about 50 nm, about 75 nm, about 100 nm, about 200 nm, about 300 nm, about 400 nm, about 500 nm, about 600 nm, about 700 nm, about 800 nm, about 900 nm, less than 1000 nm, and ranges between and including any two of these values. In some embodiments, the cellulose nanofibrils or nanocrystals are characterized as having average lengths of about 1000 nm, about 1500 nm, about 2000 nm, about 2500 nm, about 3000 nm, and ranges between and including any two of these values.

Depending on the application, the amount of water-soluble organic polymer and cellulose nanofibrils/nanocrystals and/or microfibrils/microcrystals may be varied. In some embodiments the amount of polymer and cellulose range from about 0:4 to about 4:1 by weight. In other embodiments the ratios may be about 0:4, about 1:4, about 1:3, about 1:2, about 1:1, about 2:1, about 3:1, about 4:1 weight or any range between and including any two of the foregoing ratios.

The aerogels of the present technology may be surface modified with an organosilane such that organosilyl groups are covalently attached to one or more surfaces of the aerogel. By "organosilane" is meant a compound that includes carbon and silicon atoms, but may include other types of atoms such as oxygen and halogens (F, Cl, Br, I). Similarly, organosilyl groups (or "silyl groups" for short) are groups comprising silicon and carbon atoms, but may also include oxygen, halogens or other types of atoms. Organosilanes suitable for use in the present technology include one or more leaving groups such as one or more halogens or sulfonate esters, and a substituted or unsubstituted alkyl, alkoxy, cycloalkyl, cycloalkylalkyl, alkenyl, aryl, aralkyl group, or a combination of any two or more thereof. In some embodiments, the organosilane has one or more leaving groups (e.g., halogen, tosylate, triflate, and/or mesylate) attached to the silicon and/or attached to any hydrocarbon groups that are attached to the silicon. In some embodiments, the organosilane is halogenated with 1 or more halogen atoms attached to the silicon and/or attached to any hydrocarbon groups that are attached to the silicon. For example, the organosilane compound may be fluorinated and includes, e.g., 1 or more fluorine atoms or chlorine atoms, e.g., 1, 2, 3, 4, 5, 6, 7, 8, 9, 10, 11, 12, 13, 14, 15, 16, 17, 18, 19, or 20 fluorines or chorines or any number thereof between and/or including any two of the preceding values. For example, the organosilane may be a chloro-, dichloro- or trichlorosilane with various carbon-containing substituents. Substituents may be selected from alkyl, alkoxyk, cycloalkyl, cycloalkylaryl, alkenyl, aryl, aralkyl, haloalkyl, and (meth)acrylic groups, among others. Suitable organosilanes thus include but are not limited to, methyltrichlrosilane, tridecafluoro-1,1,2,2,-tetrahydrooctyl trichlorosilane, trichloro(hexyl)silane, trichloro(octyl)silane, ethyltrichlorosilane, allyltrichlorosilane, trichloro(phenethyl)silane, 3-bromopropyltrichlorosilane, trichloro(3,3,3,trifluoropropyl)silane, (1-chloroethyl)trichlorosilane, (cyclohexylmethyl)trichlorosilane, trichloro(phenyl)silane, trichlorododecylsilane, chlorotrimethylsilane, and dichlorodimethylsilane. In some embodiments, the organosilyl groups include short alkyl and/or alkoxy groups having 1, 2, 3, or 4 carbons (e.g., methyl, methoxy, ethyl, ethoxy, and so forth).

The present aerogels typically exhibit a contact angle of at least about 110°, or at least about 120°. The contact angle, as used herein, refers to the angle at which a liquid/vapor interface meets a solid surface. In some embodiments, the contact angle may be about 100°, about 110°, about 120°, about 125°, about 130°, about 135°, about 140°, about 145°, about 150°, about 155°, about 160°, about 165°, about 170°, about 175°, about 180°, or a range between and including any two of the foregoing values. For example the contact angle may range from about 100° to about 180°, from about 110° to about 180°, from about 120° to 145°, and so forth. The exact contact angle displayed by an aerogel of the present technology will depend in part on the nature and amount of the silyl groups covalently bound to the one more surfaces of the aerogel. These contact angles are significantly greater than the contact angles observed for PVA/CNF aerogels alone. In some embodiments of the present aerogels, the contact angle may be at least about 120°.

The aerogels of the present technology are strongly oleophilic. For example, they may exhibit an absorption capacity for oil/organic solvents in the range of about 30 to about 140 times the weight of the aerogel. In some embodiments, the absorption capacity is about 30 times, about 35 times, about 40 times, about 45 times, about 50 times, about 60 times, about 70 times, about 80 times, about 90 times, about 100 times, about 110 times, about 120 times, or about 140 times the weight of the aerogel and ranges between and including any two of these values. In some embodiments, the aerogels have an absorption capacity ranging from about 45 to about 96 times the weight of the aerogel. In other embodiments, the aerogels have an absorption capacity ranging from about 49 to about 118 times the weight of the aerogel.

The present aerogels also strongly absorb metal ions. The scavenging capacity of the aerogels may, e.g., range from about 50 mg/g to about 250 mg/g, about 100 mg/g to about 200 mg/g, about 120 mg/g to about 180 mg/g, about 140 mg/g to about 160 mg/g, and ranges between and including any two of these values. In some embodiments, the aerogel compositions have a scavenging capacity from about 110 mg/g to about 165 mg/g. In some embodiments, the present aerogels scavenge heavy metal ions such as, e.g., $Hg^{2+}$, $Pb^{2+}$, $Cu^{2+}$, Ag+, or combinations of any two or more thereof.

The organosilane-coated aerogel compositions have remarkable specific compressive strength while maintaining low density. For example, in various embodiments, the aerogel compositions have a specific compressive strength in the range of about 0.01 $MPa \cdot kg^{-1} \cdot m^3$ to about 20.0 MPa $cm^3/g$, about 0.05 MPa $cm^3/g$ to about 10.0 MPa $cm^3/g$, about 0.1 MPa $cm^3/g$ to about 5.0 MPa $cm^3/g$, or about 1.0 MPa $cm^3/g$ to about 2.5 MPa $cm^3/g$. In some embodiments, the aerogel compositions have a specific compressive strength ranging from about 1.0 MPa $cm^3/g$ to about 5.0 MPa $cm^3/g$. In some embodiments, the aerogel compositions have a maximal stress at 80% strain normalized by density in the range of about 2.5 MPa $cm^3/g$ to about 6 MPa $cm^3/g$, about 3 MPa $cm^3/g$ to about 5.5 MPa $cm^3/g$, about 3.5 MPa $cm^3/g$ to about 5 MPa $cm^3/g$, or about 4 MPa $cm^3/g$ to about 4.5 MPa $cm^3/g$. In some embodiments, the aerogel compositions have a maximal stress at 80% strain normalized by density of about 3.8 MPa $cm^3/g$.

The present aerogels are very light weight due to low density. For example, the aerogels typically have a density of not more than about 500 $kg/m^3$. In various embodiments, the aerogel compositions have a density in the range of about 2 $kg/m^3$ to about 250 $kg/m^3$, about 5 $kg/m^3$ to about 200 $kg/m^3$, or about 10 $kg/m^3$ to about 150 $kg/m^3$. Examples of densities of the aerogel compositions include about 2 $kg/m^3$, about 5 $kg/m^3$, about 10 $kg/m^3$, about 20 $kg/m^3$, about 30 $kg/m^3$, about 40 $kg/m^3$, about 50 $kg/m^3$, about 60 $kg/m^3$, about 70 $kg/m^3$, about 80 $kg/m^3$, about 90 $kg/m^3$, about 100 $kg/m^3$, about 110 $kg/m^3$, about 120 $kg/m^3$, about 130 $kg/m^3$, about 140 $kg/m^3$, about 150 $kg/m^3$, about 160 $kg/m^3$, about 170 $kg/m^3$, about 180 $kg/m^3$, about 190 $kg/m^3$, about 200 $kg/m^3$, about 210 $kg/m^3$, about 220 $kg/m^3$, about 230 $kg/m^3$, about 240 $kg/m^3$, about 250 $kg/m^3$, about 400 $kg/m^3$, about 500 $kg/m^3$, and ranges between and including any two of these values. In some embodiments, the aerogel compositions have a density of about 10 $kg/m^3$ to about 15 $kg/m^3$.

The present aerogels are highly porous. For example, aerogels of the present technology may display a porosity of at least about 70%, at least about 75%, at least about 80%, at least about 85%, at least about 90%, at least about 95%, or at least about 99%. In certain embodiments, the aerogel compositions have a porosity of at least about 90%. In some embodiments, the aerogel compositions have a porosity of greater than about 98%.

Aerogels of the present technology need not contain graphene oxide or carbon nanotubes (such as, e.g., multi-walled carbon nanotubes) in order to achieve their special properties. Thus, in some embodiments, the present technology provides sustainable aerogels that include cellulose nanofibers (CNF) and/or microfibers in combination with a water soluble thermoplastic polymer (e.g., polyvinyl alcohol (PVA)) that is cross-linked to itself and/or the cellulose fibers, the surfaces of which include covalently attached organosilyl groups such as one or more of methylsilyl, methylchlorosilyl, and methyldichlorosilyl groups.

In another aspect, the present technology provides methods of making sustainable aerogels. In certain embodiments, the methods include covalently bonding organosilyl groups to one or more surfaces of an aerogel to provide an aerogel exhibiting a contact angle of at least about 110° or at least about 120°. Such aerogels include cellulose fibrils and/or crystals, a water-soluble organic polymer, wherein the water-soluble polymer is cross-linked to itself and/or to the cellulose fibrils and/or crystals. Methods of making the present aerogels may also include combining a water-soluble organic polymer and cellulose fibrils and/or crystals in water; cross-linking the water-soluble organic polymer to itself and/or the cellulose fibrils and/or crystals to form a gel; removing the water from the gel to form an aerogel; and heating the aerogel in the presence of a reactive organosilane compound. The aerogels may be made of any of the cellulose fibers and/or crystals as well as any of the water-soluble organic polymers described herein. In some embodiments, the weight ratio of water-soluble polymer to cellulose fibrils and/or crystals ranges from about 1:4 to about 4:1. Similarly, any of the cross-linking agents or organosilanes described herein may be used in the present methods. For example, the organosilane compound may include at least one halogen, tosylate, triflate, and/or mesylate group and at least one substituted or unsubstituted alkyl, alkoxyk, cycloalkyl, cycloalkylalkyl, alkenyl, aryl, and/or aralkyl group. In some embodiments, the organosilane is methyltrichlorosilane.

The water in the aerogel compositions prepared using the above methods can be removed by several methods known in the art. Examples of such methods include freeze drying, vacuum drying, supercritical drying and the like. In some embodiments, the water is removed by freeze-drying the gel to provide the aerogel. Freeze drying is inexpensive, easy, environmentally friendly, scalable, and capable of producing high-quality components in any desired geometry.

The aerogel compositions of the present technology can be tuned for specific applications by modifying the amount and type of materials used, the processing conditions or other parameters. For example, the aerogels can be tailored using a variety of known post-treatment methods, giving them a flexibility to be used in several applications such as the those mentioned above.

These hybrid organic aerogels possess excellent properties such as enhanced robustness, improved deformability, high compressive strain, ultra-low density, superhydrophobicity, and superoleophilicity. Because of their excellent mechanical, thermal, and surface properties, these aerogels are potentially useful for a wide range of applications. For example, the aerogel compositions of the present technology may serve as excellent absorbents. Thus, in another aspect, the present technology provides an absorbent composition which includes any of the aerogels disclosed above. In some embodiments, the aerogel is an oil/organic solvent absorbent or metal ion scavenger, including a heavy metal ion scavenger.

The methods described herein can be used to prepare large-scale superhydrophobic and superoleophilic PVA/CNF aerogels by an environmentally friendly freeze-drying process followed by thermal chemical vapor deposition of methyltrichlorosilane. The silane-treated PVA/CNF hybrid aerogels have ultra-low densities (<15 kg $m^{-3}$), very high porosities (>98%), and excellent oil/solvent absorption capabilities (49 to 118 times their own dry weight). Thus, aerogels of the present technology are made of renewable/sustainable materials through simple and green processes and can be mass-produce to be used in various applications, for example to purify water and clean up oil/chemical spills/leaks.

In yet another aspect, the present technology provide methods of using the aerogels described herein. Thus, in some embodiments, water contaminated by metals (including heavy metals) and/or non-polar compounds may be purified by exposing the water to an aerogel of the present technology. In some embodiments of such methods, the water is contaminated by crude oil, diesel fuel, gasoline and/or organic solvents. In certain embodiments the water is contaminated by one or more of $Pb^{2+}$, $Hg^{2+}$, $Ag^+$, and $Cu^+$.

All references cited herein are specifically incorporated by reference in their entirety and for all purposes as if fully set forth herein.

The present technology is further illustrated by the following examples, which should not be construed as limiting in any way.

EXAMPLES

Example 1

Preparation of Cellulose Nanofibrillated Fibers (CNFs)

The cellulose used for producing the CNFs was a commercially supplied fully bleached eucalyptus Kraft pulp. PVA (Mw-95000 g $mol^{-1}$), glutaraldehyde (GA, crosslinker, 25 wt. % in $H_2O$), 2,2,6,6-tetramethyl-1-piperidinyloxy (TEMPO, 98 wt. %), methyltrichlorosilane (97 wt. %) and Oil Red O were all obtained from Sigma Aldrich. 1,2,3,4-Butanetetracarboxylic acid (BTCA, 98 wt %) was obtained from Acros Organics. Sodium chlorite, sodium bromide, sodium hypochlorite solution, and other chemicals were of laboratory grade (Fisher scientific, USA) and used without further purification.

The TEMPO-oxidized CNFs used in this study were prepared according to the work reported by Saito et al. (*Biomacromecules*, 2009, 10, 1992-1996). Briefly, bleached eucalyptus pulp fibers were carboxylated using 2,2,6,6-tetramethylpiperidine-1-oxyl (TEMPO), sodium chlorite, and sodium hypochlorite as the reactants at 60° C. for 48 hours. TEMPO oxidized pulp fibers were then washed thoroughly using distilled water and homogenized in a disk refiner to break apart fibril bundles. The fiber slurry was diluted to facilitate separation of coarse and fine fractions by centrifugation at 12,000 G. Subsequently, the coarse fraction was rejected. The nanofibril suspension was concentrated to a solid content of approximately 0.65 wt. % using ultrafiltration. A final refining step was performed, in which the nanofibril suspension was passed once through an M-110EH-30 Microfluidizer (Microfluidics, Newton, Mass.) with 200- and 87-µm chambers in series. The obtained CNF suspension was stored at 4° C. without any treatment before future utilization. The carboxylate content of the CNFs were measured via titration based on the TAPPI Test Method T237 cm-98 protocol and was found to be 0.64 mmol COONa per gram of CNF suspension.

Example 2

Preparation of Crosslinked PVA Aeroels with Glutaraldehyde

For comparison purposes, crosslinked PVA aerogels were prepared. PVA solution (4.0 mL, 0.05 g $mL^{-1}$) and a desired amount of water were mixed together in a flask under vigorous stirring for 1 h. Then, glutaraldehyde solution (80 µL, 25 wt. %) and sulfuric acid (80 µL, 1.0 vol %) were added to the PVA solution. The resulting mixture was mixed under stirring for another hour. At the final stage, the mixture was sonicated in an ultrasonic bath for 1 h under vacuum to obtain the aqueous gels. After being transferred into aluminum pans, the aqueous gel was crosslinked in a vacuum oven at 75° C. for 3 h. The PVA aerogels were fabricated using the freeze-drying process described herein and were stored in a vacuum oven for further characterization.

Example 3

Preparation of Crosslinked PVA/CNF Aeroels with Glutaraldehyde

Crosslinked PVA/CNF aerogels were also prepared for comparison purposes by following a similar procedure as described above. PVA solution (2.0 mL, 0.05 g $mL^{-1}$), CNF solution (15.4 g, 0.65 wt. %), and a desired amount of water (depending on the specific density of the aerogels) were mixed together in a flask under vigorous stirring for 1 h. The weight ratio between the PVA and CNF was 1:1 for the PVA/CNF aerogels. Glutaraldehyde solution (80 µL, 25 wt. %) and sulfuric acid (80 µL, 1.0 vol %) were added to the PVA/CNF solution. The resulting mixture was constantly stirred for another hour. At the final stage, the mixture was sonicated in an ultrasonic bath for 1 h under vacuum to obtain the aqueous gels. After being transferred into aluminum pans, the aqueous gels were crosslinked/cured in a vacuum oven at 75° C. for 3 h. PVA/CNF aerogels were obtained using the freeze-drying process described herein and were stored in a vacuum oven for further characterization.

Example 4

Preparation of Organosilylated Crosslinked PVA/CNF Aeroels

The organosilyl surface modification of the PVA/CNF aerogels was carried out by thermochemical vapor deposition (CVD). A small glass vial containing methyltrichlorosilane (The amount of silane added was calculated by the following equation: V=1+Vaerogel/1250 (mL)) together with the aerogel samples was placed in a vacuum desiccator operated at 80 kPa below atmospheric pressure, the desiccator was sealed and heated in a vacuum-assisted oven at 50° C. for 10 h to 24 h. To remove the excess unreacted organosilane and the by-product (HCl), the surface-treated aerogels were kept in a vacuum desiccator under vacuum for at least 1 h.

Example 5

Small-Scale Preparation of Crosslinked PVA/CNF Aeroels with BTCA

The PVA solution (2.0 mL, 0.05 g $mL^{-1}$), CNF solution (15.4 g, 0.65 wt. %), and a desired amount of water (depending on the specific density of the aerogels) were mixed together in a flask under vigorous stirring for 1 h. The weight ratio between the PVA and CNF was 1:1 for the PVA/CNF aerogels. Then, 1,2,3,4-butanetetracarboxylic acid (BTCA, 10.0 mg) and sodium hypophosphite (5.0 mg) solution were added to the PVA/CNF solution. The resulting mixture was mixed under constant stirring for an additional one hour. The resulting mixture was then vacuumed to remove any bubbles that formed under agitation. The resulting aqueous gel was transferred into aluminum pans, and a freeze-drying process was used to fabricate the PVA/CNF aerogel. Specifically, the aqueous gel was precooled in a 4° C. refrigerator overnight to avoid macroscopic fracture during the freezing step. The precooled aqueous gel was then frozen at −78° C. in a dry ice-acetone solution and the resulting frozen sample was freeze-dried using a standard laboratory freeze drier (Labconaco, 4 L) at a condenser temperature of −87.0° C. under vacuum (0.0014 mBar) for three days to produce the aerogel. The crosslinked aerogel was obtained by heating the sample in a vacuum oven at 150° C. for one hour. The aerogel was stored at room temperature for further coating and characterization.

Example 6

Large-Scale Preparation of Crosslinked PVA/CNF Aerogels with BTCA

The PVA solution (100 mL, 0.05 g mL$^{-1}$), CNF solution (770 g, 0.65 wt. %), and a desired amount of water (depending on the specific density of the aerogels) were mixed together in a flask under vigorous stirring for 1 h. The weight ratio between the PVA and CNF was 1:1 for the PVA/CNF aerogels. Then, BTCA (500 mg) and sodium hypophosphite (250 mg) solution were added to the PVA/CNF solution. The resulting mixture was mixed under constant stirring for an additional one hour. The resulting mixture was then vacuumed to remove any bubbles that formed under agitation. The resulting aqueous gel was transferred to plastic trays (35×27×1.9 cm$^3$) and was subsequently freeze-dried in a general purpose freeze drier for 6 days; the temperature on the first day ranged from −4° C. to −20° C. without the vacuum. After freezing the gel, the temperature was set to −69° C. to −72° C. with the condenser for the following days. The crosslinked aerogel was obtained by heating the sample in a vacuum oven at 150° C. for one hour. The aerogel was stored at room temperature for further coating and characterization.

Example 7

Freeze-Drying Process

The crosslinked aqueous gels were precooled in a 4° C. refrigerator overnight to avoid macroscopic fracture during the freezing step and were then frozen at −78° C. in a dry ice-acetone solution. The frozen samples were freeze-dried in a lyophilizer at a condenser temperature of −87.0° C. under vacuum (0.0014 mBar) for three days to produce the aerogels.

Example 8

Characterization Methods

The mechanical (e.g., compressive strength and strain), physical (e.g., organosilane bonding, density, and moisture absorbance) and morphological properties of the aerogels prepared using the methods described above were systematically characterized. For each type of characterization described below, all tests were measured at least in triplicate and the average results as well as the standard deviations were reported. The densities of the aerogels were calculated based on the measurements of their masses and dimensions. The microstructures of the aerogels and elemental analysis were studied using a scanning electron microscope (SEM, LEO GEMINI 1530) equipped with energy-dispersive X-ray spectroscopy (EDX). The SEM samples were coated using gold sputtering. A contact angle goniometer (OCA 15/20, Future Digital Scientific Corp., USA) was used for the contact angle measurements that were carried out at room temperature with water. The volume of water droplet was fixed at 4.0 μL and the contact angles were measured at five different positions on each sample. The values reported were measured at 10 s after deposition of the droplets. The average value of the five measurements performed were reported as the contact angle. The FT-IR spectra were recorded using a tensor 27 spectrometer (Bruker, USA) with 4 cm$^{-1}$ resolution at room temperature. An ICP (inductively coupled plasma) atomic emission spectrometer (Optima 2000, PerkinElmer Inc., USA) was used for the metal ion analysis in aqueous solutions. Compression testing was conducted using an Instron (model 5967) fitted with a 250 N load. The compression strain rate was set to 10% min$^{-1}$. Cylindrical aerogels (with a diameter about 60 mm and height about 10 mm) were used for the compression testing. Thermal stability measurements were carried out using a thermogravimetric analyzer (TGA, Q50 TA Instruments, USA) from 30 to 800° C. at 10° C. per minute under a nitrogen atmosphere.

Oil/Organic Solvent Absorption of the Aerogels

The oil and/or solvent absorption of the aerogels were measured by immersing approximately 30 mg of the organosilane-coated aerogels into various types of oil and/or solvent and water with a 1:1 volume ratio except for chloroform. The chloroform absorption was measured by immersing the aerogel directly into the solvent because it has a higher density than water. The absorption process generally reached an equilibrium within a few minutes. Once absorption was completed, the soaked aerogels were removed from the oil/water mixture and weighed. The aerogel surface was blotted using a filter paper to remove excess surface solvent/oil and the absorption capacity (Q) was calculated from mass gain using the following equation:

$$Q(\%) = \frac{(W - W_0) \times 100\%}{W_0} \qquad (1)$$

where W and $W_0$ are the weights of the aerogels before and after absorption, respectively. The weight measurements of the aerogels with absorbed oil were conducted without delay to avoid evaporation of the oil and/or solvent.

Porosity Calculation of Aerogels

The density of the solid materials ($\rho_s$) was calculated according to the solid density of each component and their weight ratios used in the formulation, as the following equation 2, $$\rho_s = \frac{1}{\frac{W_{silane}}{\rho_{silane}} + \frac{W_{CNF}}{\rho_{CNF}} + \frac{W_{PVA}}{\rho_{PVA}}} \qquad (2)$$

where W was the weight percentage of the different components, and $\rho_{silane}$, $\rho_{CNF}$, and $\rho_{PVA}$ were the solid densities of silane, CNF and PVA, respectively. The densities of the silane, CNFs and PVA used for this study were 1273, 1460 and 1269 kg m$^{-3}$, respectively, according to the manufacturer's data sheet.

The porosity of aerogels was calculated using equation 3, $$\text{Porosity} = \left(1 - \frac{\rho}{\rho_s}\right) \times 100\% \quad (3)$$

where $\rho$ was the density of aerogel, $\rho_s$ was the density of solid materials.

Heavy Metal Ion Scavenging

The scavenging capacity of the aerogels on heavy metal ions including $Pb^{2+}$, $Hg^{2+}$, $Ag^+$ and $Cu^{2+}$ were investigated. To measure the scavenging capacity, approximately 14 mg organosilane-coated aerogels and 50 mL of a heavy metal ion solution (50 mg L$^{-1}$) were stirred at room temperature for 3 days to reach binding equilibrium. Prior to mixing, a few droplets of ethanol were applied to the surface of the aerogels. The heavy metal ion concentrations were measured with an ICP atomic emission spectrometer and the binding capacity of the heavy metal ions to the aerogels were calculated using the following equation:

$$\text{Binding Capacity} = \frac{(C_I - C_{eq}) \times V}{M} \quad (4)$$

where $C_I$ and $C_{eq}$ (mg L$^{-1}$) are the initial and equilibrium concentrations of the heavy metal ions in aqueous solution, respectively, while V is the volume of heavy metal ion solution (L) and M is the mass of the aerogels (g).

RESULTS

Organosilane Bonding Determined by EDX and FTIR Crosslinked with Glutaraldehyde

Figure 1B:
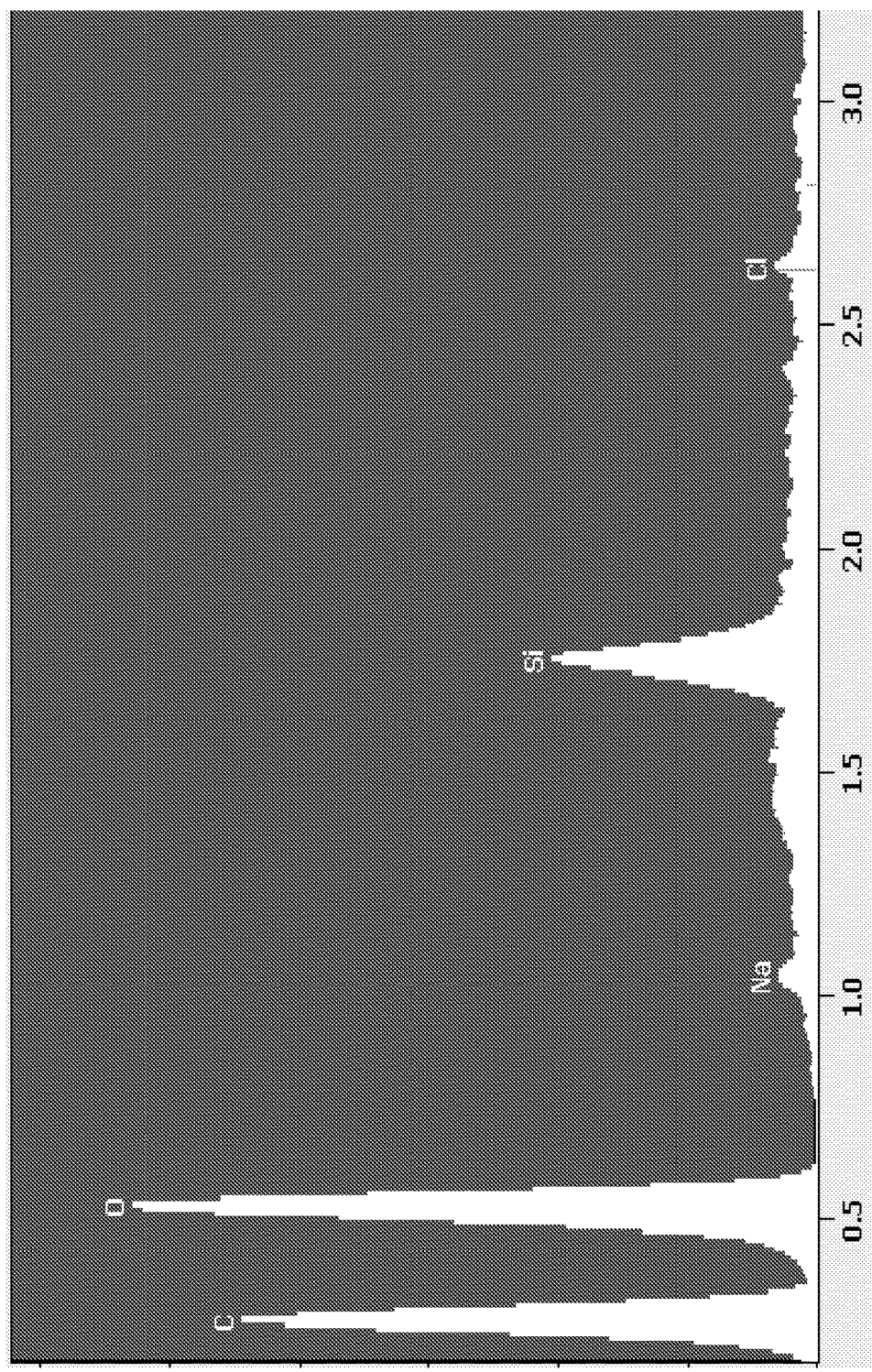
FIG. 1B shows the EDX spectrum of an illustrative embodiment of a silylated PVA/CNF aerogel.
Figure 2:
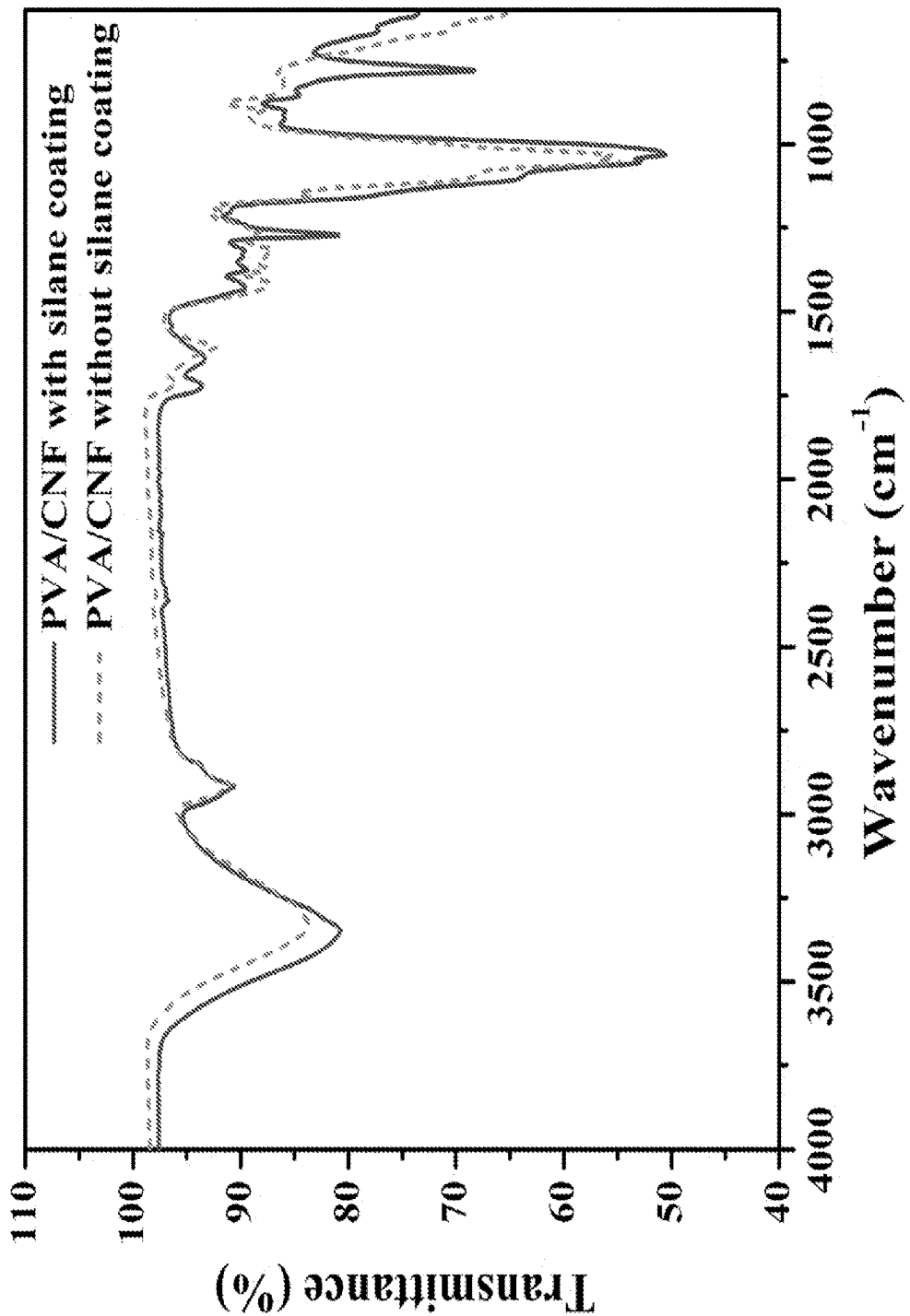
FIG. 2 shows FTIR spectra of a PVA/CNF aerogel crosslinked with glutaraldehyde without an organosilane coating as well as an illustrative embodiment of a silylated PVA/CNF aerogel crosslinked with glutaraldehyde.

The successful silane coating of the PVA/CNF aerogels crosslinked with glutaraldehyde was confirmed by energy dispersive X-ray analysis (EDX) analysis (FIGS. 1A-1B) and FTIR analysis (FIG. 2). The EDX spectrum of uncoated PVA/CNF aerogel crosslinked with glutaraldehyde showed carbon, oxygen, and sodium peaks, but lacked any silicon detection (FIG. 1A). Following silanization, the EDX spectrum showed peaks for carbon, oxygen, sodium, chlorine, and silicon (FIG. 1B). Silicon was detected at 4.44% (relative atomic % by element). Silanization of the porous PVA/CNF aerogels crosslinked with glutaraldehyde was further confirmed by FTIR analysis (FIG. 2). The detected absorption bands at approximately 780 cm$^{-1}$ and approximately 1272 cm$^{-1}$ are ascribed to the characteristic vibrations of Si—O—Si and C—Si asymmetric stretching in C—Si—O units, respectively.

Microstructures of the Silylated Aerogels Crosslinked with Glutaraldehyde

The organosilane-coated PVA/CNF aerogel crosslinked with glutaraldehyde was successfully prepared using a freeze-drying method. Under optimal processing conditions, very little shrinkage was observed in the aerogels compared to their initial hydrogel dimensions. While not wishing to be bound by theory, it is anticipated that the coated aerogel increased in hydrophobicity due to functionalization of the PVA/CNF aerogel hydroxyl groups with methyltrichlorosilane. Silylation occurred in the gaseous phase through a simple thermal chemical vapor deposition method. The density of the uncoated PVA/CNF aerogels was 10.6 kg m$^{-3}$ and increased to 13.0 kg m$^{-3}$ after organosilane coating.

FIGS. 3A-3D shows the microstructures of the bottom surfaces of the PVA and PVA/CNF aerogels crosslinked with glutaraldehyde before and after silane coating. FIGS. 3A and 3C show the uncoated PVA and PVA/CNF aerogels. FIGS. 3B and 3D show the coated PVA and PVA/CNF aerogels. PVA and PVA/CNF aerogels before and after silane treatment all exhibited an interconnected, highly porous cellular structure with relatively uniform pore sizes (typically 2 to 6 μm). In addition, more nanofiber-like structures appeared on the surface of the cellular wall after silanization (FIGS. 3B and 3D). Not wishing to be bound by theory, it is believed more nanofiber-like structures appeared on the surface due to the formation of silicone nanofilaments. Previous studies have found that depending on the silane reaction conditions, different types of coating may be formed. See Fedeev, A. Y.; McCarthy, T. J. Self-Assembly Is Not the Only Reaction Possible between Alkyltrichlorosilanes and Surfaces: Monomolecular and Oligomeric Covalently Attached Layers of Dichloro- and Trichloroalkylsilanes on Silicon, *Langmuir*, 2000, 16, 7268-7274. Under relatively dry conditions (i.e., with a relative humidity below 35%), organosilanes form either self-assembled monolayers (horizontal polymerization) or covalently attached monolayers. Under relatively wet conditions (i.e., with a relative humidity ranging from 35 to 65%), organosilanes form covalently attached cross-linked polymeric fibers/layers (vertical polymerization).

FIGS. 4C and 4D show the microstructure of the PVA/CNF aerogel crosslinked with glutaraldehyde cross-sections at the middle of the aerogel samples before and after silane treatment. The PVA/CNF aerogels again exhibited a relatively uniform cellular structure with pore sizes typically in the range of 10 to 20 μm, which was several times larger than the pore sizes on the bottom surface. The bottom surface of the aerogels was in contact with the aluminum pan that was immersed in the dry ice-acetone solution. Differences in pore morphology between the bulk structure and the surface layers of aerogels were also reported in cellulose and poly-(N-isopropyl acrylamide)/clay aerogels fabricated using the freeze-drying process. See Sehaqui, H., et al. Mechanical Performance Tailoring of Tough Ultra-high Porosity Foams Prepared from Cellulose I Nanofiber Suspensions, *Soft Matter*, 2010, 6, 1824-1832; Haraguchi, K.; Matsuda, K. Spontaneous Formation of Characteristic Layered Morphologies in Porous Nanocomposites Prepared from Nanocomposite Hydrogels, *Chem. Mater.*, 2005, 17, 931-934. However, similar to what was observed on the aerogel bottom surface, more nanofiber-like structures grew randomly on the PVA/CNF aerogel cellular walls, which was likely attributable to the formation of silicone nanofilaments (FIG. 4D). FIGS. 4A and 4B show the microstructure of the PVA aerogel at the cross-section at the middle of the samples. Unlike the microstructure of the PVA/CNF aerogel cross-section, or that of the PVA aerogel bottom surface, the PVA aerogel cross-section largely exhibited a lamellar structure. Not wishing to be bound by theory, it is believed this may be attributed to the fact that the precursor solution for the PVA aerogel had a low viscosity, thereby allowing the PVA polymer chains to easily align along the direction of the growing front of ice crystals during freezing. In contrast, the PVA/CNF hydrogel solution used to prepare the PVA/CNF aerogel had a much higher viscosity due to the formation of a 3D network arising from the entanglement of high-aspect-ratio CNFs and thus may have affected the nucleation and growth of the ice crystals.

Surface Wettability of the Aerogels Crosslinked with Glutaraldehyde

Figure 5A:
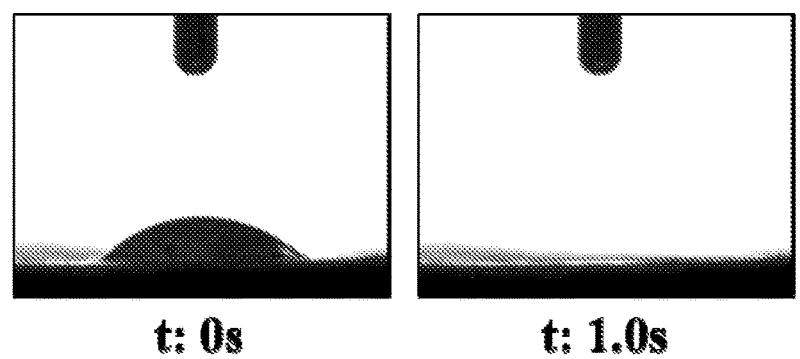
FIGS. 5A and 5B illustrate contact angle measurements of PVA/CNF aerogels (FIG. 5A) and silylated PVA/CNF aerogels crosslinked with glutaraldehyde (FIG. 5B).
Figure 5B:
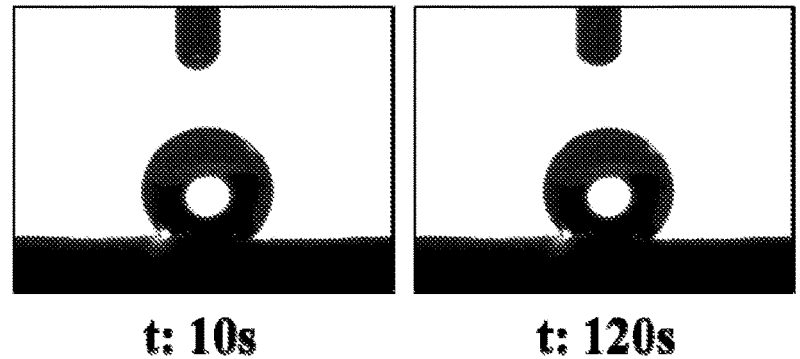

The surface wettability of the PVA/CNF (organosilyl coated and uncoated) aerogels crosslinked with glutaraldehyde were studied via contact angle measurements. As shown in FIG. 5A, for the uncoated PVA/CNF aerogels, water droplets were readily absorbed within 1 s. As shown in FIG. 5B, the organosilane-coated aerogel became superhydrophobic with a highly increased water contact angle of $\theta \approx 150.3 \pm 1.2°$ at $t=10$ s. After 120 s, the water droplet on the silylated aerogel maintained its initial contact angle as well as its round shape.

When the superhydrophobic silylated aerogel was immersed into water by applying an external force, the aerogel became afloat immediately after releasing the external force without any water absorption. This observation implies that the superhydrophobic organosilane-coated PVA/CNF aerogel can be used to absorb organic solvents and/or oil on water. The organosilane-coated aerogel also exhibited a low adhesion to water. When water droplets were applied to the surface of the silylated PVA/CNF aerogel, they easily rolled off the surface. In contrast, when gasoline droplets were applied to the surface they were readily absorbed by the organosilane-coated PVA/CNF aerogel. Thus, organosilane-coated PVA/CNF aerogels are highly oleophilic. The simultaneous superhydrophobicity and superoleophilicity exhibited by organosilane-coated PVA/CNF aerogels ensures their superior oil/solvent absorbance.

Oil/Solvent Absorption of the Aerogels Crosslinked with Glutaraldehyde

Removal of oils and organic contaminants from water has attracted immense academic and commercial interest, because of the need to clean up industrial byproducts such as oily waste water and/or oil/chemical spills/leaks. The superhydrophobic and superoleophilic organosilane-coated PVA/CNF aerogels crosslinked with glutaraldehyde may make the technology an ideal absorbent material for removing such oil and organic solvents. An organosilane-coated aerogel crosslinked with glutaraldehyde with a density of 13.0 kg m$^{-3}$ was used to investigate the oil absorption performance. A mixture of oil/solvent with water was made by stirring 10 mL of oil/solvent and 10 mL of water for 2 minutes. Following mixing, 30 mg of organosilane-coated aerogel crosslinked with glutaraldehyde was placed on the surface of oil/solvent and water mixture. The oil/solvent was absorbed for 5 minutes by the aerogel without any water absorption. Because chloroform is denser than water, the aerogel was immersed directly in chloroform to test the absorption of this solvent.

Figure 6A:
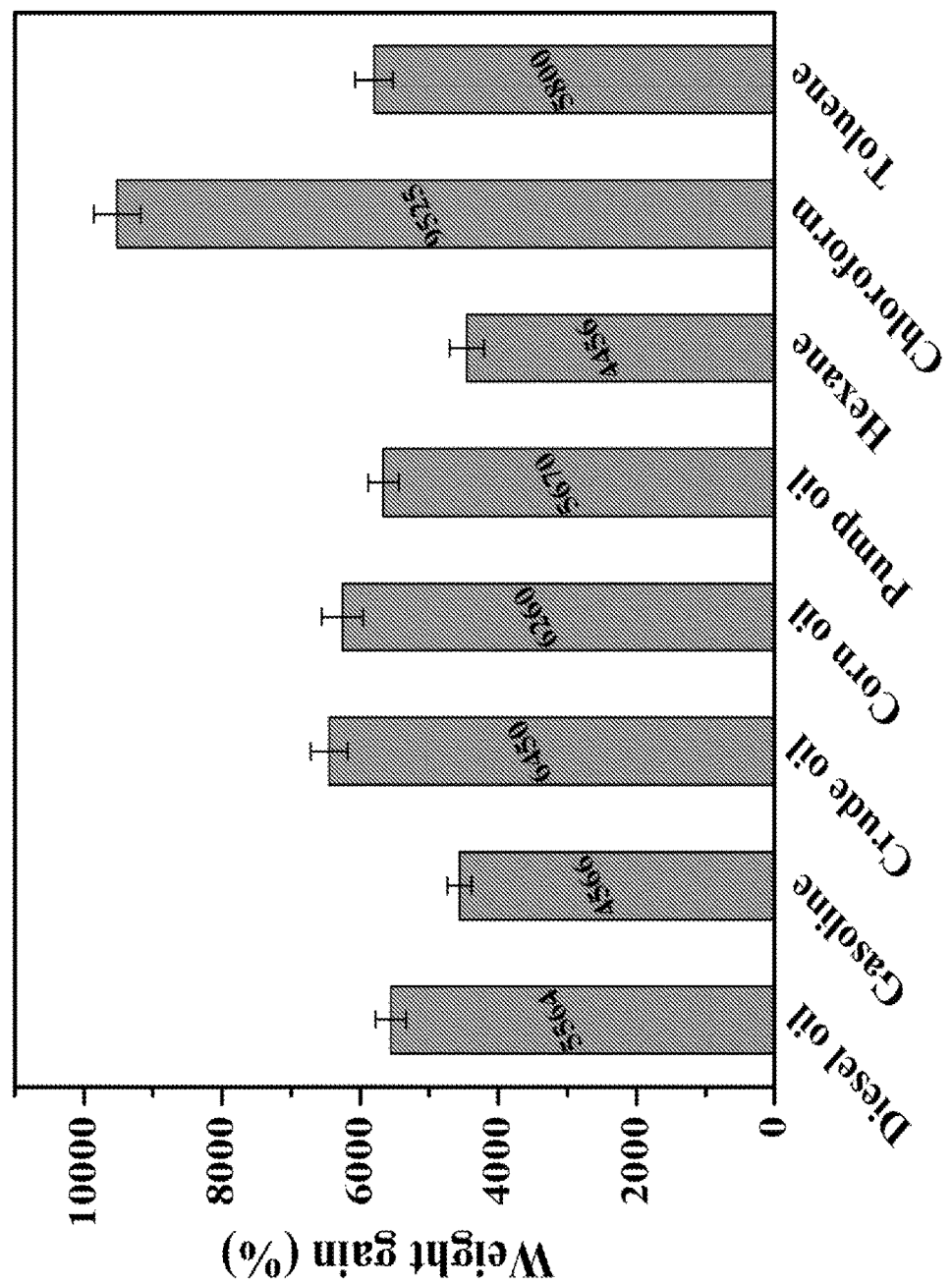
FIG. 6A is a graph showing the absorption capacities of illustrative embodiments of silylated PVA/CNF aerogels crosslinked with glutaraldehyde for various organic solvents and oils as demonstrated by weight gain.
Figure 6B:
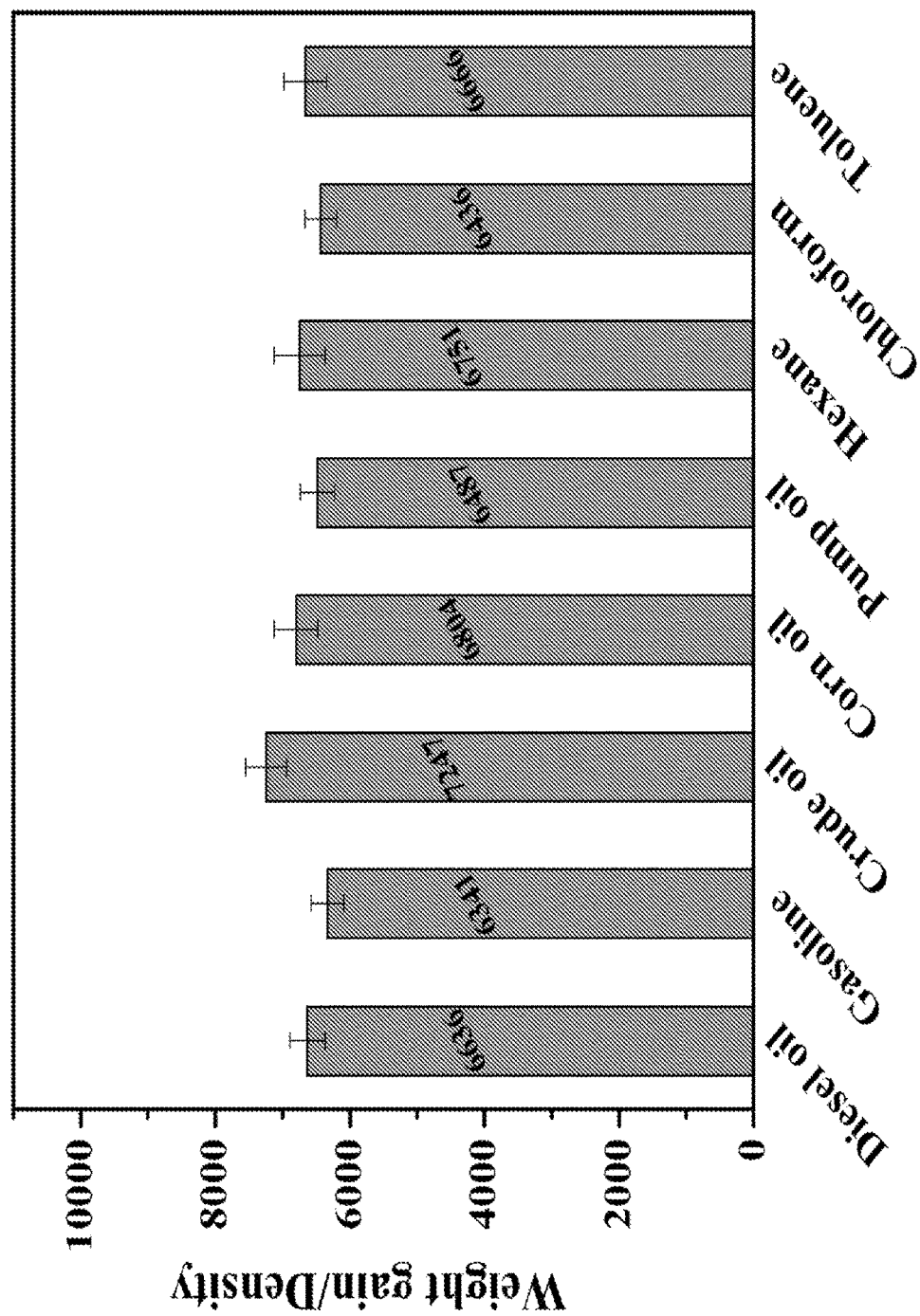
FIG. 6B is a graph showing the absorption capacities of the same silylated PVA/CNF aerogels crosslinked with glutaraldehyde normalized by the density of the respective oil or organic solvent.
Figure 7A:
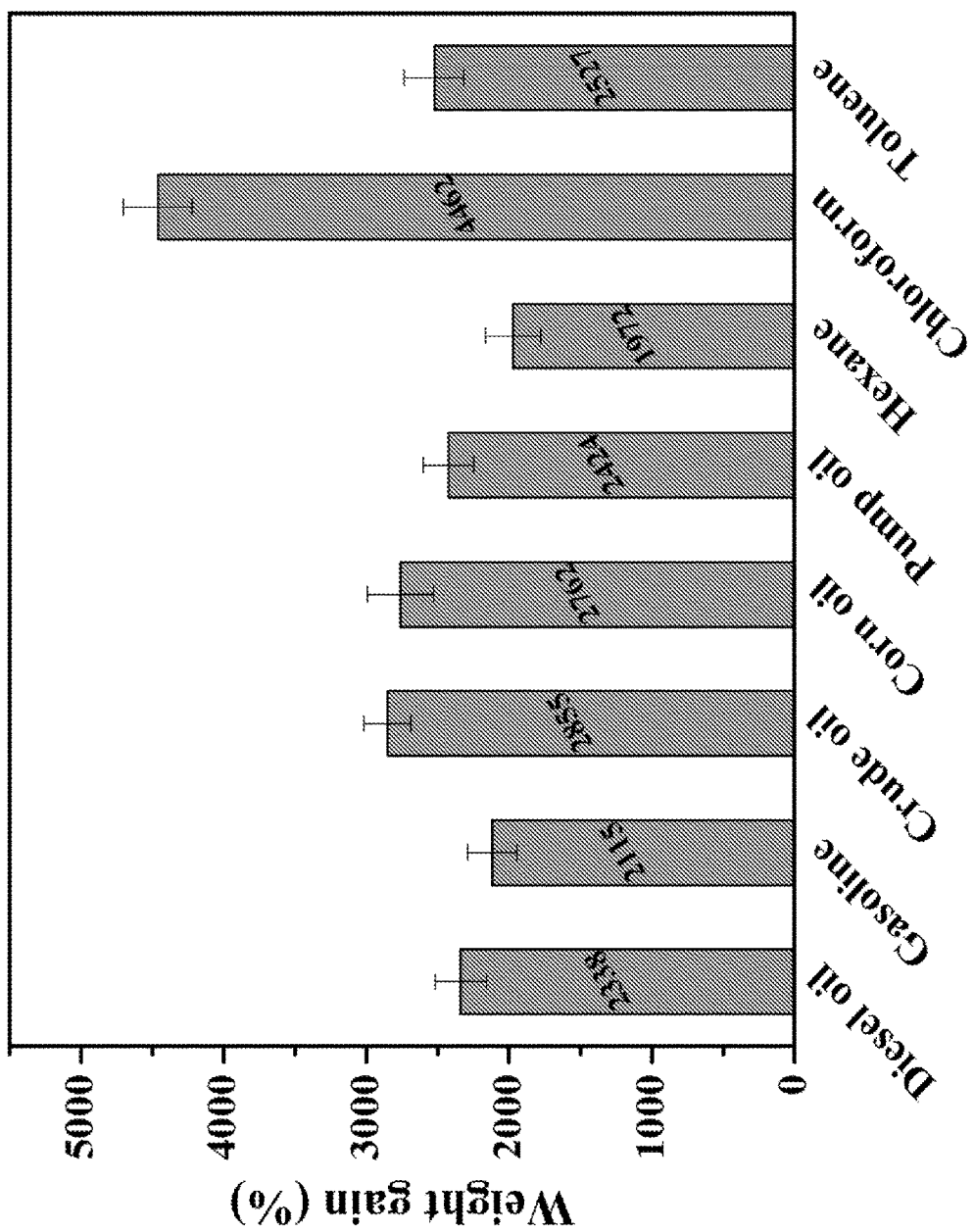
FIG. 7A is a graph showing the absorption capacities of PVA aerogels (i.e., non-silylated) crosslinked with glutaraldehyde for various organic solvents and oils as demonstrated by weight gain.

The absorption capacities for a wide range of organic solvents and oils were studied resulting in absorptions ranging from 45 to 96 times the organosilane-coated aerogel weights. Such absorption is much higher than those of most existing oil-absorption materials (e.g., polymeric, graphene-based aerogels and natural absorbents). The absorption performance of the organosilane-coated PVA/CNF aerogels for different oils and organic solvents were measured and reported in FIG. 6A. While not wishing to be bound by theory, it is predicted that the excellent oil/solvent absorption capability can be attributed to the PVA/CNF aerogels' highly porous structure and uniform superoleophilic and superhydrophobic organosilane coating. The various recorded oil/solvent absorption capacities were normalized by dividing the weight gain by the density of the respective oil/organic solvent (FIG. 6B). For comparison purposes, the oil/solvent absorption capacities of the organosilane-coated PVA aerogels crosslinked with glutaraldehyde with a similar density (14.2 kg m$^{-3}$) were observed (FIGS. 7A-7B). The absorption capacities of the organosilane-coated PVA/CNF aerogels (FIG. 6B) were two to three times higher than that of the organosilane-coated PVA aerogels (FIG. 7B). Similarly, organosilane-coated CMF had excellent absorption capacities. While not wishing to be bound by theory, the significant absorption differences may be attributed to the unique microstructure exhibited by the organosilane-coated CMF and PVA/CNF aerogels including uniform pore size and highly interconnected porous structure.

Heavy Metal Ion Scavenging Crosslinked with Glutaraldehyde

Figure 8:
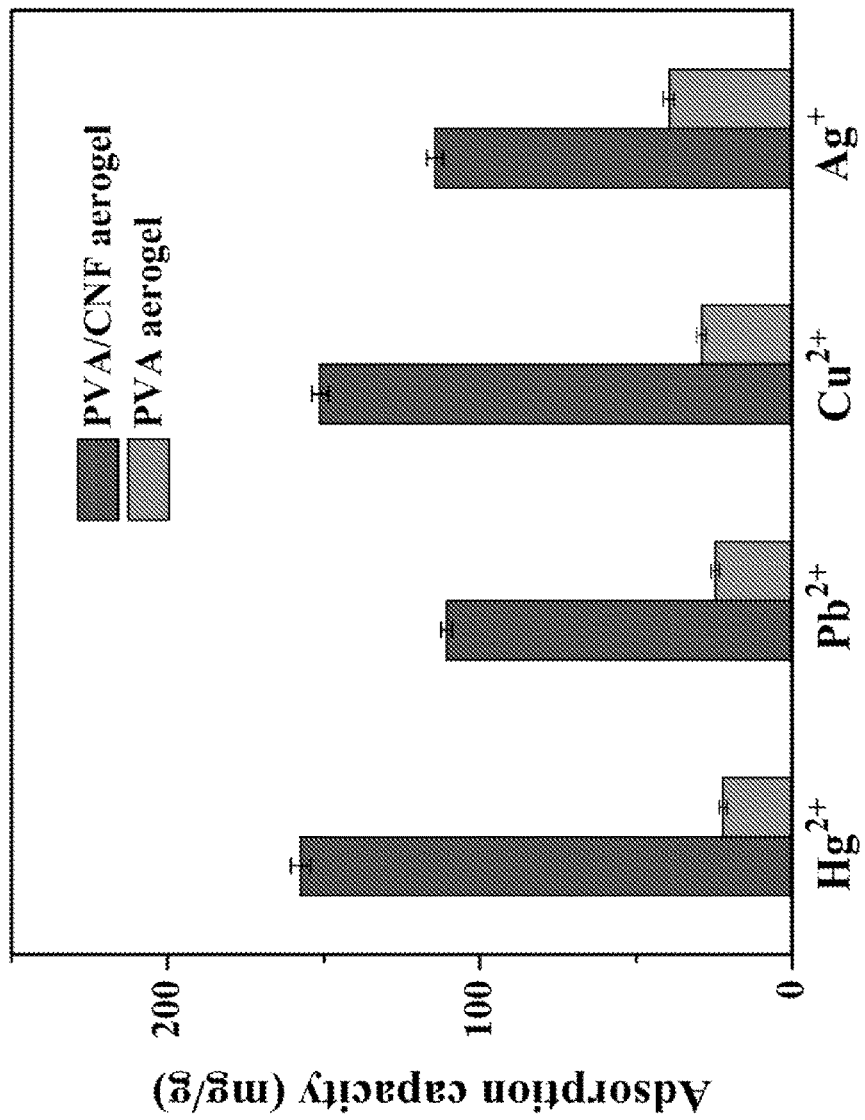
FIG. 8 is a graph illustrating the heavy metal ion scavenging capabilities of an organosilane-coated PVA aerogel crosslinked with glutaraldehyde (control) and illustrative embodiment of an organosilane-coated PVA/CNF aerogel crosslinked with glutaraldehyde.

Organosilane-coated PVA/CNF and organosilane-coated PVA aerogels crosslinked with glutaraldehyde affinities for heavy metal ions were observed via their scavenging capacities (FIG. 8). The scavenging capacities of the organosilane-coated PVA/CNF for $Hg^{2+}$, $Pb^{2+}$, $Cu^{2+}$ and $Ag^+$ were 157.5 mg g$^{-1}$, 110.6 mg g$^{-1}$, 151.3 mg g$^{-1}$, and 114.3 mg g$^{-1}$, respectively. The scavenging capacities of the organosilane-coated PVA for $Hg^{2+}$, $Pb^{2+}$, $Cu^{2+}$, and $Ag^+$ were 22.0 mg g$^{-1}$, 24.5 mg g$^{-1}$, 28.9 mg g$^{-1}$, and 39.5 mg g$^{-1}$, respectively. The results were an extremely high heavy ion scavenging capacity for the organosilane-coated PVA/CNF aerogel as compared to the organosilane-coated PVA aerogel and other materials previously reported in the literature. While not wishing to be bound by theory, it is believed that metal ion scavenging by porous materials, such as aerogels, in aqueous solution is mainly driven by the electrostatic interaction and complexation between the metal ions and the carboxyl groups present in the porous materials. One reason for the much higher metal ion scavenging capability exhibited by the organosilane-coated PVA/CNF aerogel may be attributed to the fact that the CNFs in the PVA/CNF aerogel carried many carboxyl groups. Such reasoning may also explain the differences in the scavenging capacity for the different metal ions, since the metal ions likely have different affinities to carboxyl groups. The superior oil/solvent absorbing performance and metal ion scavenging ability exhibited by organosilane-coated PVA/CNF aerogels crosslinked with glutaraldehyde makes it a versatile agent for water purification.

Thermal Stability of the Aerogels Crosslinked with Glutaraldehyde

Figure 9:
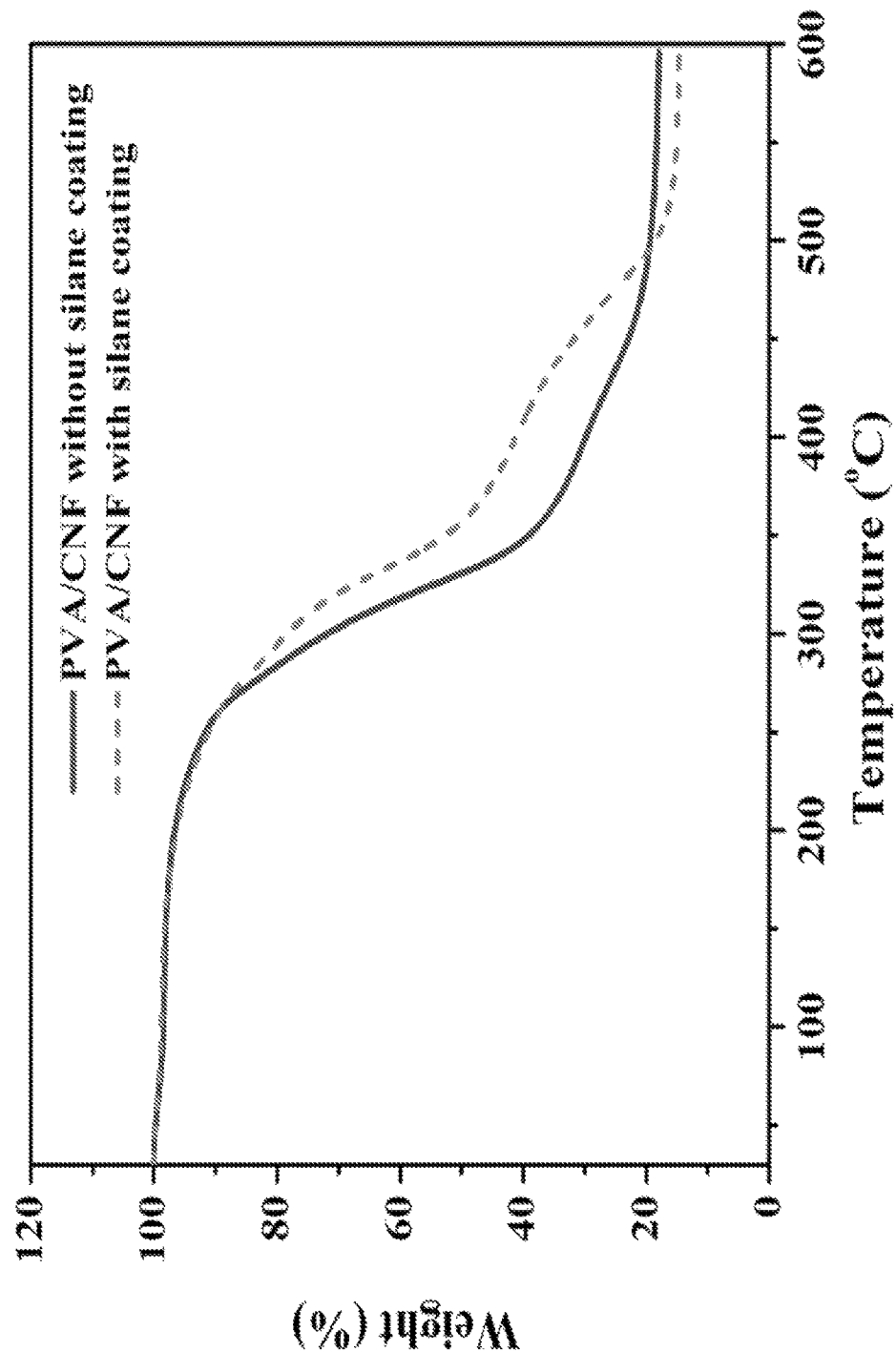
FIG. 9 is a graph illustrating the thermogravimetric analysis (TGA) curve of illustrative embodiment of PVA/CNF aerogels crosslinked with glutaraldehyde with and without an organosilane coating.

The thermal stability of the PVA/CNF aerogels crosslinked with glutaraldehyde were measured before and after organosilane treatment using thermogravimetric analysis (TGA) in nitrogen from 30 to 600° C. (FIG. 9). Organosilane-coating of the PVA/CNF aerogel did not change the thermal stability up until about 270° C. However, from about 270° C. to about 495° C., the thermal stability of the organosilane-coated aerogel was somewhat improved compared to the noncoated PVA/CNF aerogel. For example, the temperatures corresponding to a 30% weight loss were 320.7 and 302.5° C., for the organosilane-coated and uncoated PVA/CNF aerogels, respectively. While not wishing to be bound by theory, it is predicted that the thermal stability difference may be attributed to the retardation of the PVA thermal decomposition by covalent bonds formed between the PVA and organosilane compounds.

Mechanical Properties of the Organosilane-Coated PVA/CNF Aerogels Crosslinked with Glutaraldehyde The compressive behaviors of the organosilane-coated PVA/CNF aerogel crosslinked with glutaraldehyde are shown in FIGS. 10A-10D. To determine the mechanical properties of the silylated PVA/CNF aerogel, their compressive stress as a function of strain and their cyclic compression behaviors were studied before and after organosilane treatment. Both the silylated and non-silylated aerogels compressed by more than 90%, likely due to their high porosity. However, the noncoated PVA/CNF aerogel was not very elastic and deformed permanently when the compression stain was more than 20%. In contrast, the organosilane-coated PVA/CNF aerogel completely recovered its original shape with no mechanical failure after being subjected to 80% strain.

Figure 10A:
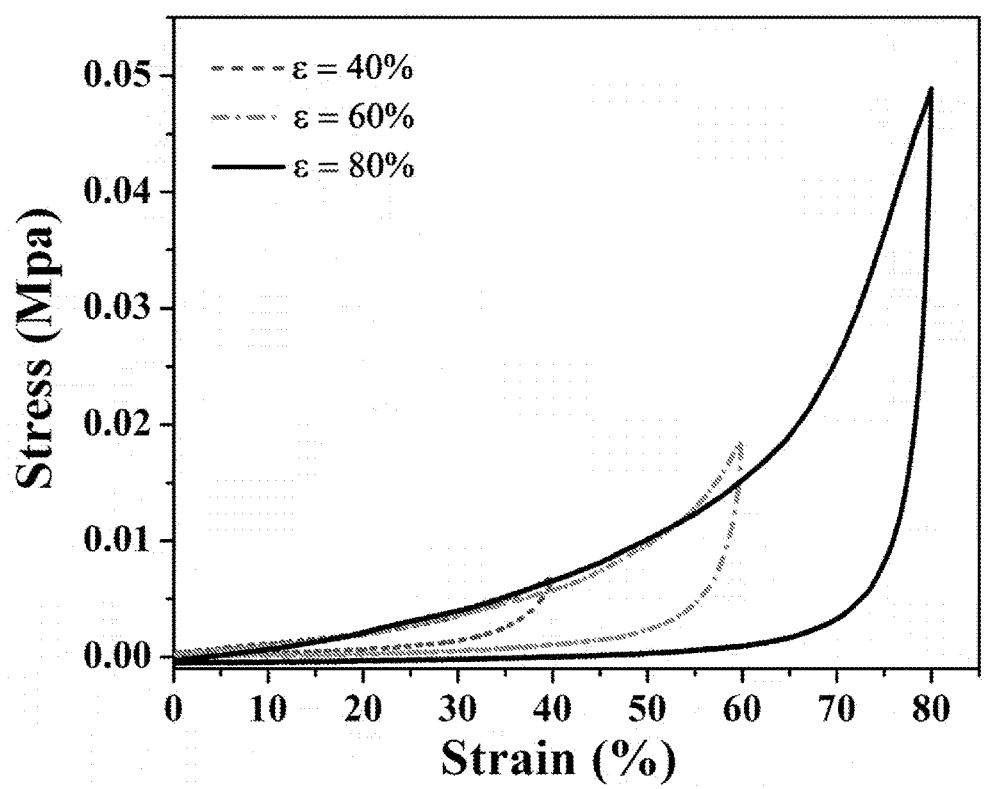
FIGS. 10A-10D show graphs illustrating the compressive behaviors of illustrative embodiments of silylated PVA/CNF aerogels crosslinked with glutaraldehyde.
Figure 10B:
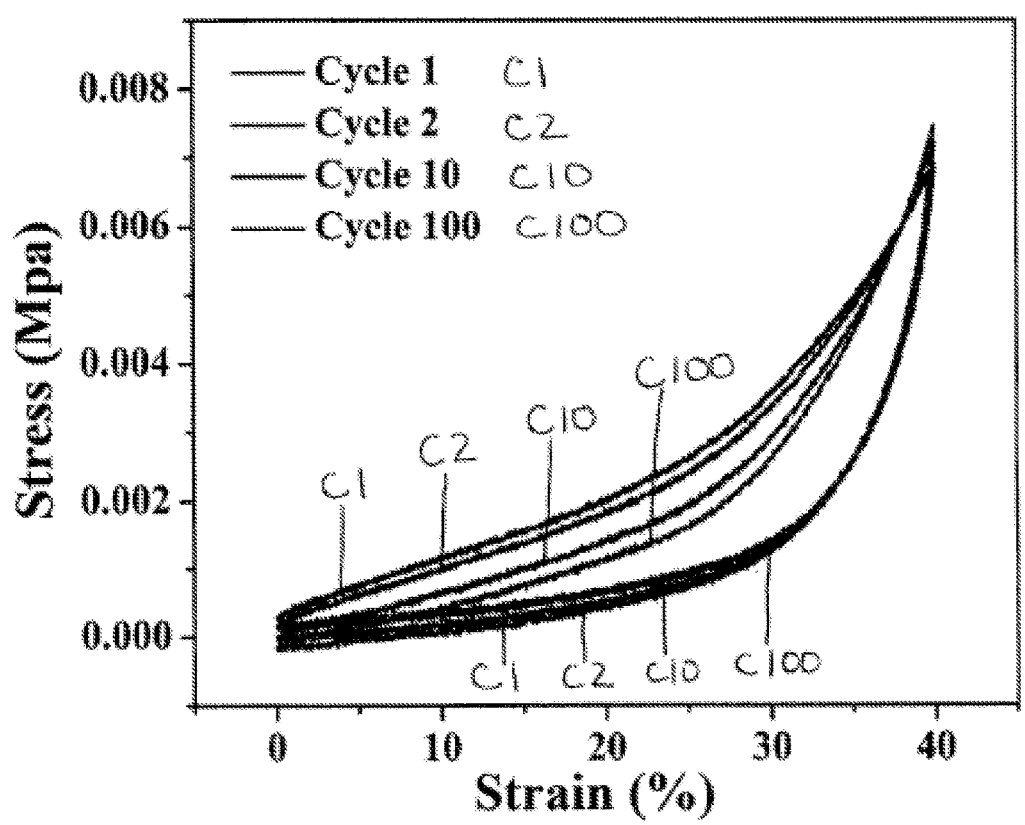
Figure 10C:
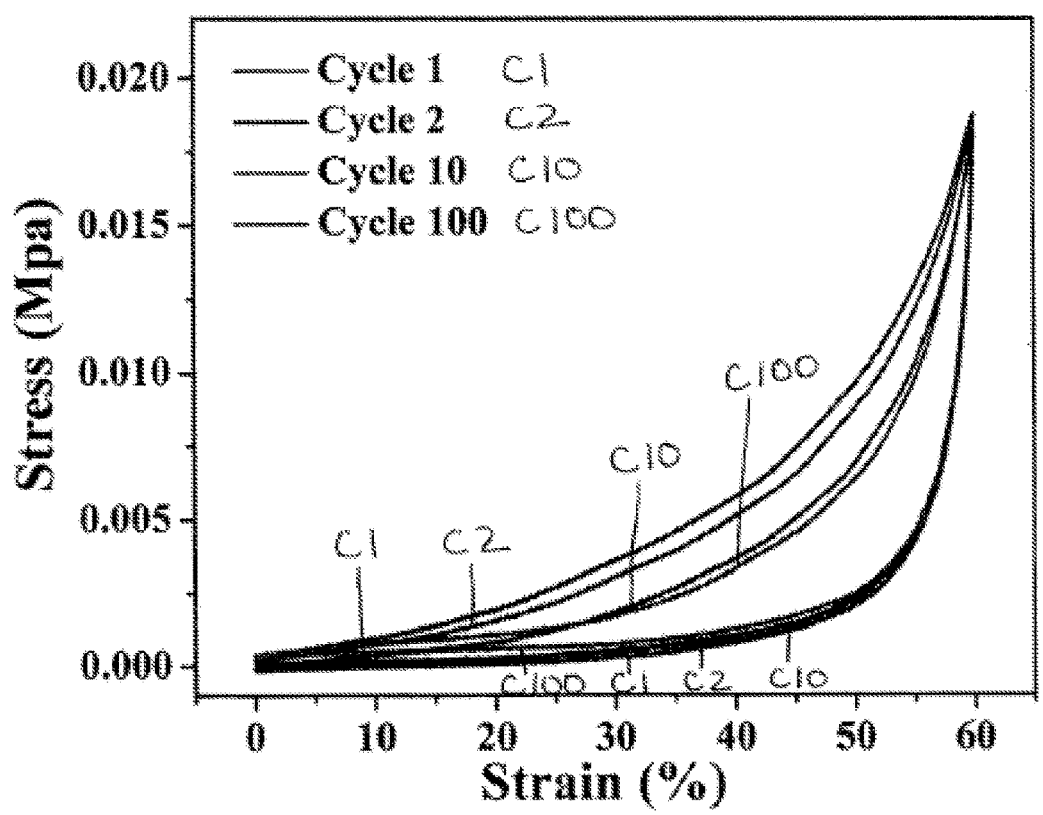
Figure 10D:
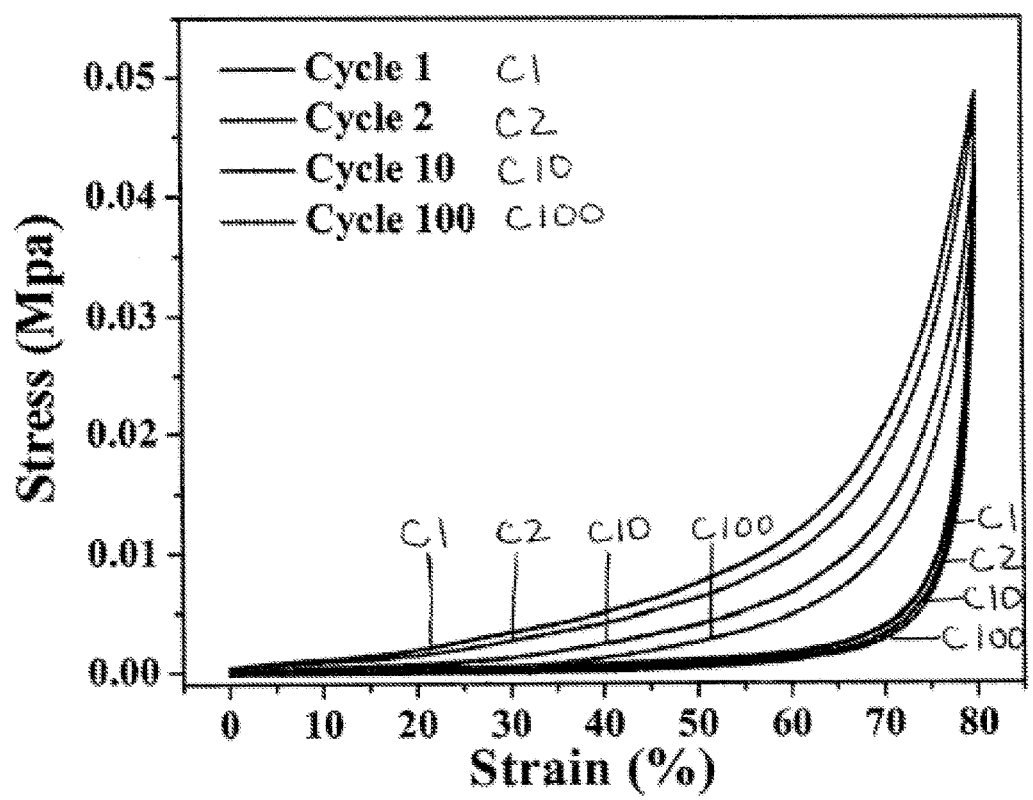

FIG. 10A shows the cyclic compression stress-stain curve of the organosilane-treated PVA/CNF aerogels at a maxima strain of 40%, 60%, and 80%. The organosilane-coated aerogels completely recovered their original shape after unloading at each strain. The maximal stress at 80% strain normalized by the density was about 3.8 MPa $cm^3$ $g^{-1}$, which is larger than the value measured for other polymeric aerogels. The organosilane-coated aerogels were subjected to a fatigue cyclic compression test (at 40%, 60%, and 80% strain) with 100 loading/unloading cycles (FIGS. 10B, 10C, 10D). The compressive stress-stain curves did not change significantly after 100 cycles, which demonstrated excellent elastic recovery during the cyclic compression tests. Although hysteresis loops were shown in the loading-unloading cycles, indicating dissipation, the organosilane-coated PVA/CNF aerogels were significantly more elastic (40-80%) than other aerogels at comparable compression stains.

Large-Scale Preparation for PVA/CNF Aerogels Crosslinked with BTCA

The scale-up process for large-size high performance aerogels were developed and optimized using the industrial size freeze drier (SP Scientific, general purpose freeze drier, 35 L). Both small- and large-scale PVA/CNF aerogels were successfully prepared using a freeze-drying method. In order to obtain hydrophobic aerogels, the hydroxyl groups present on the porous surface of the aerogel were functionalized with methyltrichlorosilane in a gaseous phase through a simple thermal chemical vapor deposition method. The densities of the small-scale and large-scale PVA/CNF aerogels before and after the silane treatment were 10.5/13.6 kg $m^{-3}$ and 11.2/14.0 kg $m^{-3}$, respectively. All aerogels exhibited a very high porosity (>98%). The porosity of aerogels was calculated using Equations 2 and 3.

Microstructures of the Silylated Aerogels Crosslinked with BTCA

FIGS. 11A-11D shows the microstructures of the cryofractured surfaces of the small-scale PVA/CNF aerogel crosslinked with BTCA before (FIGS. 11A and 11B) and after (FIGS. 11C and 11D) silane treatment. PVA/CNF aerogels before and after silane treatment all exhibited an interconnected, highly porous cellular structure with relatively uniform pore sizes (typically 2 to 6 μm). In addition, more nanofiber-like structures appeared on the surface of the cellular wall after silanization, likely due to the formation of silicone nanofilaments (FIGS. 11C and 11D). FIGS. 12A-12D shows the microstructure of the cryofractured surfaces of the large-scale PVA/CNF aerogel before (FIGS. 12A and 12B) and after (FIGS. 12C and 12D) silane treatment. Similar to what we observed in the small-size PVA/CNF aerogel crosslinked with BTCA sample, the large-size PVA/CNF aerogels crosslinked with BTCA produced by using the industrial size freeze drier again exhibited a relatively uniform cellular structure with pore sizes typically in the range of 10 to 40 μm (FIGS. 12A-12D), which was several times larger than the pore sizes on the small-scale sample. This observation may be attributed to different freeze-drying process. The small-size aerogel were prepared by freezing the aqueous gel in a dry ice-acetone solution (−87.0° C.), which freezes much more quickly than the large-size aerogel in the chamber (up to ~−20.0° C.), thereby affecting the nucleation and growth of the large ice crystals. Subsequent sublimation of these large crystals led to the formation of larger micron-sized pores in the aerogels.

Oil/Solvent Adsorption of the Large-Scale and Small-Scale Produced Aerogels Crosslinked with BTCA As discussed above, removal of oils and organic contaminants from water has attracted immense academic and commercial interest. The silane-coated PVA/CNF aerogels (both small-size and large-size) were used to investigate the oil absorption performance. Once a piece of the silane-coated aerogel was placed on the surface of the oil/solvent and water mixture, the oil/solvent was quickly absorbed by the aerogel within a few minutes, without absorbing water. The oil/solvent (except chloroform due to its high density)-filled aerogel could be left floating on water essentially without any oil release or water absorption.

Figure 13A:
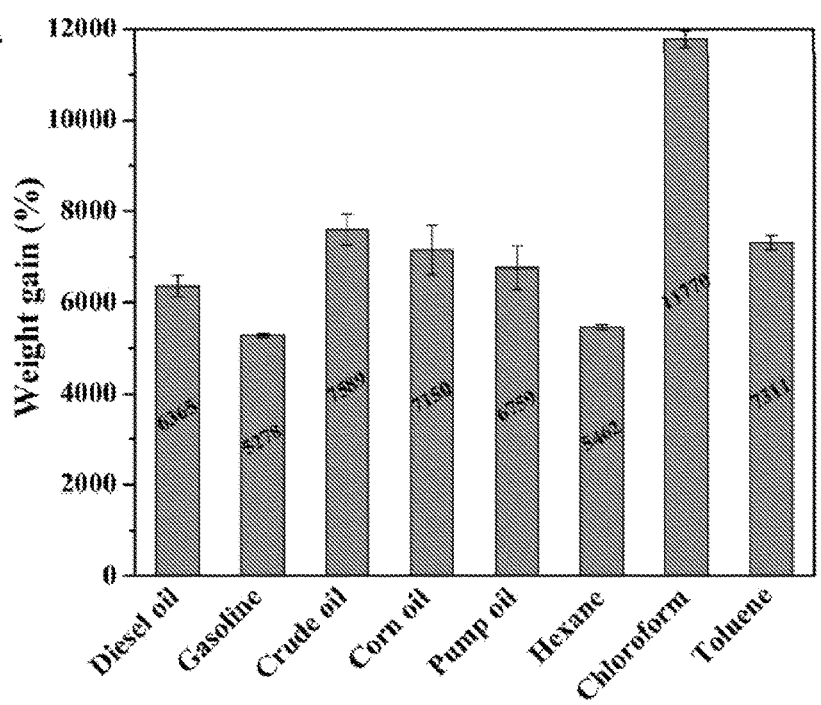
FIG. 13A is a graph showing the absorption capacities of illustrative embodiments of small-size silane-coated PVA/CNF aerogels crosslinked with BTCA for different oils and organic solvents.
Figure 13B:
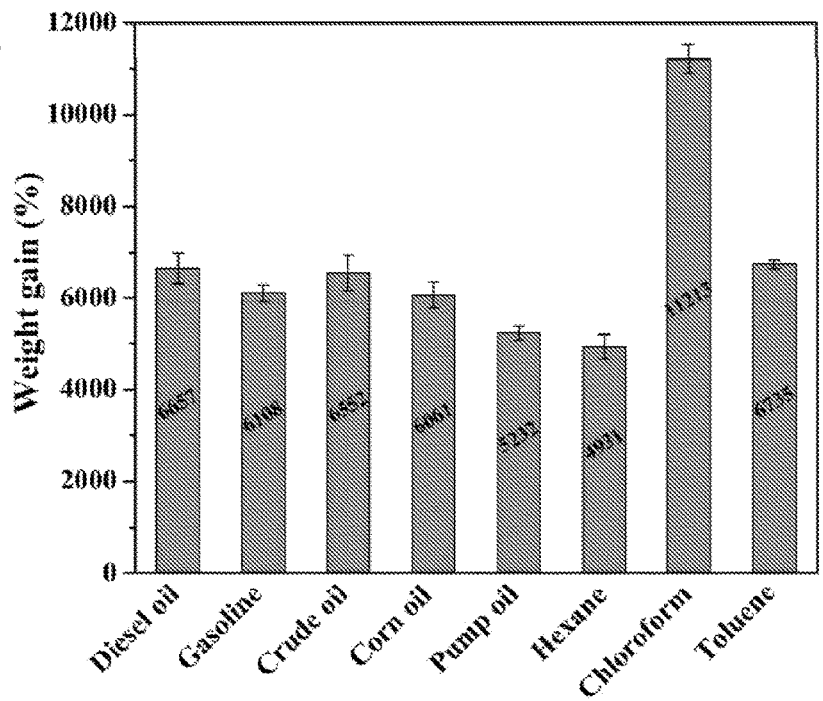
FIG. 13B is a graph showing the absorption capacities of illustrative embodiments of large-size silane-coated PVA/CNF aerogels crosslinked with BTCA for different oils and organic solvents.

The absorption performance of both small-size and large-size silane-coated PVA/CNF aerogels crosslinked with BTCA for different oils and organic solvents was measured and reported in FIGS. 13A-13B. The absorption capacities of small-size aerogel for a wide range of organic solvents and oils ranged from 52 to 118 times that of the aerogel's weight (FIG. 13A), which is much higher than most existing oil-absorption materials. The excellent oil/solvent absorption capability exhibited by the PVA/CNF aerogel can be attributed to its highly porous structure as well as the uniform superoleophilic and superhydrophobic silane coating. The absorption capacities of PVA/CNF crosslinked by BTCA are higher than the previous work, which the PVA/CNF aerogel was crosslinked by glutaraldehyde (with a typical weight gain ranging from 44 to 96 times their own dry weight). The oil/solvent absorption capacities of the silane-coated large-size PVA/CNF aerogels with a similar density (14.0 kg $m^{-3}$) to that of the small-size PVA/CNF aerogels were also measured and are presented in FIG. 13B. Even though the absorption capacities of the large-size PVA/CNF aerogels were slightly decreased compare to that of the small-size silane-treated PVA/CNF aerogels, which may be attributed to the unique microstructure exhibited by the small-size PVA/CNF aerogels that included more uniform and smaller pore sizes and higher surface area, the absorption capacities of the large-size PVA/CNF aerogels is still much higher than most existing oil-absorption materials (ranging from 50 to 112 times their own dry weight).

EQUIVALENTS

The embodiments, illustratively described herein, may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

The invention claimed is:

1. An aerogel comprising:
   cellulose fibrils and/or crystals,
   a water-soluble organic polymer, and
   an organosilane coating comprising organosilyl groups covalently attached to one or more outer surfaces of the aerogel,
   wherein:
   the water-soluble organic polymer is cross-linked to itself and/or to the cellulose fibrils and/or crystals,
   each organosilyl group comprises one or more groups selected from halogens, sulfonate esters, and $C_1$-$C_4$ alkoxy groups, and one or more substituted or unsubstituted alkyl, alkoxy, cycloalkyl, cycloalkylalkyl, alkenyl, aryl, and/or aralkyl groups, or a combination of any two or more thereof, provided that the organosilyl group does not contain any fluorine atoms, and
   the aerogel exhibits a water contact angle of at least about 110°, provided that the aerogel does not contain graphene oxide.

2. The aerogel of claim 1, wherein the aerogel has a water contact angle of at least about 120°.

3. The aerogel of claim 1, wherein the aerogel has a density ranging from about 5 kg m$^{-3}$ to about 100 kg m$^{-3}$.

4. The aerogel of claim 1, wherein the cellulose fibrils and/or crystals are cellulose nanofibrils and/or nanocrystals.

5. The aerogel of claim 4, wherein the cellulose nanofibrils and/or nanocrystals have a diameter of 5 to 30 nm and length of 10 nm to 3 micrometers.

6. The aerogel of claim 1, wherein the cellulose fibrils and/or crystals are cellulose microfibrils and/or microcrystals.

7. The aerogel of claim 1, wherein the water-soluble organic polymer is a thermoplastic polymer.

8. The aerogel of claim 1, wherein the water-soluble organic polymer is polyvinyl alcohol, polyethylene glycol, polyacrylamide, polyacrylic acid, polymethacrylic acid, or a combination of any two or more thereof.

9. The aerogel of claim 1, wherein the water-soluble organic polymer has a weight-average molecular weight ranging from about 500 to about 200,000 Da.

10. The aerogel of claim 1, wherein the water-soluble organic polymer is polyvinyl alcohol.

11. The aerogel of claim 1, wherein the water-soluble organic polymer is a thermoset polymer.

12. The aerogel of claim 1, wherein the water-soluble organic polymer is polymerized resorcinol-formaldehyde, phenol-formaldehyde, urea-formaldehyde, polyamic acid salt or a combination of any two or more thereof.

13. The aerogel of claim 1, wherein the water-soluble organic polymer is polymerized resorcinol-formaldehyde.

14. The aerogel of claim 1, wherein the water-soluble organic polymer is cross-linked with sodium borate, boric acid, organic dialdehyde, or a combination of any two or more thereof.

15. The aerogel of claim 1, wherein the water-soluble organic polymer is cross-linked with glutaraldehyde.

16. The aerogel of claim 1, wherein the water-soluble organic polymer is cross-linked with 1,2,3,4-butanetetracarboxylic acid.

17. The aerogel of claim 1, wherein each organosilyl group comprises one or more chlorine atoms or a $C_1$-$C_2$ alkoxy and one or more substituted or unsubstituted $C_1$-$C_8$ alkyl groups.

18. The aerogel of claim 1, wherein the weight ratio of water-soluble organic polymer to cellulose fibrils and/or crystals ranges from about 1:4 to about 4:1.

19. The aerogel of claim 1, wherein the maximal stress at 80% strain normalized by density is from about 2.5 MPa cm$^3$ g$^{-1}$ to about 6 MPa cm$^3$ g$^{-1}$.

20. A method of making an aerogel of claim 1, the method comprising:
   preparing an uncoated aerogel by combining a water-soluble organic polymer and cellulose fibrils and/or crystals in water;
   cross-linking the water-soluble organic polymer to itself and/or the cellulose fibrils and/or crystals to form a gel;
   removing the water from the gel to form the uncoated aerogel;
   heating the uncoated aerogel in the presence of an organosilyl group to provide an organosilane coating on one or more of the outer surfaces of the uncoated aerogel;
   wherein each organosilyl group comprises one or more leaving groups selected from halogens, sulfonate esters, and $C_1$-$C_4$ alkoxy groups, and one or more substituted or unsubstituted alkyl, alkoxy, cycloalkyl, cycloalkylalkyl, alkenyl, aryl, and/or aralkyl group, or a combination of any two or more thereof, provided that the organosilyl group does not contain any fluorine atoms;

wherein the organosilyl groups are covalently bonded to the one or more outer surfaces of the uncoated aerogel to provide an aerogel exhibiting a water contact angle of at least about 110°; and wherein the aerogel does not contain graphene oxide.

21. The method of claim 20, wherein the weight ratio of the water-soluble organic polymer to the cellulose fibrils and/or crystals ranges from about 1:4 to about 4:1.

22. The method of claim 20, wherein each organosilane compound comprises one or more chlorine atoms or a $C_1$-$C_2$ alkoxy and one or more substituted or unsubstituted $C_1$-$C_8$ alkyl groups.

23. The method of claim 20, wherein the providing the organosilane coating is carried out by thermal chemical vapor deposition.

24. An absorbent comprising the aerogel of claim 1.

25. A method of removing heavy metals and/or non-polar compounds from water using the aerogel of claim 1, comprising exposing water contaminated by heavy metals and/or non-polar compounds to the aerogel.

* * * * *